(12) United States Patent
Yonemura et al.

(10) Patent No.: US 8,782,114 B2
(45) Date of Patent: Jul. 15, 2014

(54) ARITHMETIC DEVICE

(75) Inventors: Tomoko Yonemura, Kanagawa (JP);
Taichi Isogai, Tokyo (JP); Hirofumi Muratani, Kanagawa (JP); Atsushi Shimbo, Tokyo (JP); Yoshikazu Hanatani, Tokyo (JP); Kenichiro Furuta, Tokyo (JP); Kenji Ohkuma, Kanagawa (JP); Yuichi Komano, Kanagawa (JP); Hanae Ikeda, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 376 days.

(21) Appl. No.: 13/355,642

(22) Filed: Jan. 23, 2012

(65) Prior Publication Data

US 2012/0124114 A1 May 17, 2012

Related U.S. Application Data

(63) Continuation of application No. PCT/JP2009/063224, filed on Jul. 23, 2009.

(51) Int. Cl.
*G06F 7/00* (2006.01)
*H04L 9/30* (2006.01)

(52) U.S. Cl.
CPC .................................. *H04L 9/3073* (2013.01)
USPC ........................................................ 708/492

(58) Field of Classification Search
USPC ......................................... 708/492, 203–204
See application file for complete search history.

(56) References Cited

U.S. PATENT DOCUMENTS

| 2009/0207999 | A1* | 8/2009 | Yonemura et al. | ............... 380/30 |
| 2010/0046741 | A1 | 2/2010 | Isogai et al. | |
| 2010/0049777 | A1 | 2/2010 | Yonemura et al. | |
| 2010/0063986 | A1* | 3/2010 | Yonemura et al. | ............. 708/492 |

OTHER PUBLICATIONS

International Search Report mailed Aug. 18, 2009, issued for PCT/JP2009/063224, filed Jul. 23, 2009.
International Wrriten Opinion mailed Aug. 18, 2009, issued for PCT/JP2009/063224, filed Jul. 23, 2009.
Rubin, Karl and Alice Silverberg, Torus-Based Cryptography, Advances in Cryptology (CRYPTO 2003), 2003, p. 1-17.

(Continued)

*Primary Examiner* — Tan V. Mai
(74) *Attorney, Agent, or Firm* — Oblon, Spivak, McClelland, Maier & Neustadt, L.L.P.

(57) ABSTRACT

According to one embodiment, a representation converting unit converts a set of n elements $(h_0, h_1, \ldots, h_{n-1})$ ($h_i$: a member of a finite field $F_{p^m}$, $0 \le i \le n-1$) that is a projective representation of a member g of an n-th degree algebraic torus $T_n(F_{p^m})$ (n: positive integer, p: prime number, m: positive integer) into a limited projected representation expressed by a set of n elements $(h'_0, h'_1, \ldots, h'_{n-1})$ ($h'_i$: a member of the finite field $F_{p^m}$, $0 \le i \le n-1$) in which at least one element out of the n elements is a zero element 0 or an identity element 1. An arithmetic unit omits part of $F_{p^m}$ operation that is arithmetic operation in the finite field $F_{p^m}$ based on a fact that an element in the set of n elements $(h'_0, h'_1, \ldots, h'_{n-1})$ represented by the limited projective representation is a zero element "0" or an identity element "1" when performing $F_{p^{mn}}$ operation that is arithmetic operation of a finite field $F_{p^{mn}}$ in combination with the $F_{p^m}$ operation.

5 Claims, 9 Drawing Sheets

(56) References Cited

OTHER PUBLICATIONS

Rubin, Karl, Compression in Finite Fields and Torus-Based Cryptography, SIAM J. Comput. vol. 37, Isssue 5, 2008, p. 1401-1428.
Van Dijk, Marten, Practical Cryptography in High Dimensional Tori, Advances in Cryptology (EUROCRYPT 2005), 2005, p. 1-17.
Yonemura, "Daisuteki Torus-jo no Angokei Heiho Enzan no Kosokuka Shuho", IEICE Technical Report, vol. 108, No. 355, Dec. 2008, vol. 108, pp. 45 to 52.
Isoya, "Daisuteki Torus-jo no Angokei ni Okeru Kosoku Bekijo Enzanho", IEICE Technical Report, vol. 108, No. 355, Dec. 2008, vol. 108, pp. 53 to 60.
Galbraith, Steven, "Disguising Tori and elliptic Curves", IACR e-print Archive 2006/248, http://eprint.iacr.org/2006/248.
Yonemura, Tomoko, et al. "How to Construct the Cramer-Shoup Encryption Scheme on Algebraic Tori", Computer Security Symposium 2008 (with English abstract).
Isogai, Taichi, et al. "Evaluation of Exponentiation on Algebraic Tori", 2009 Symposium on Cryptography and Information Security.

\* cited by examiner

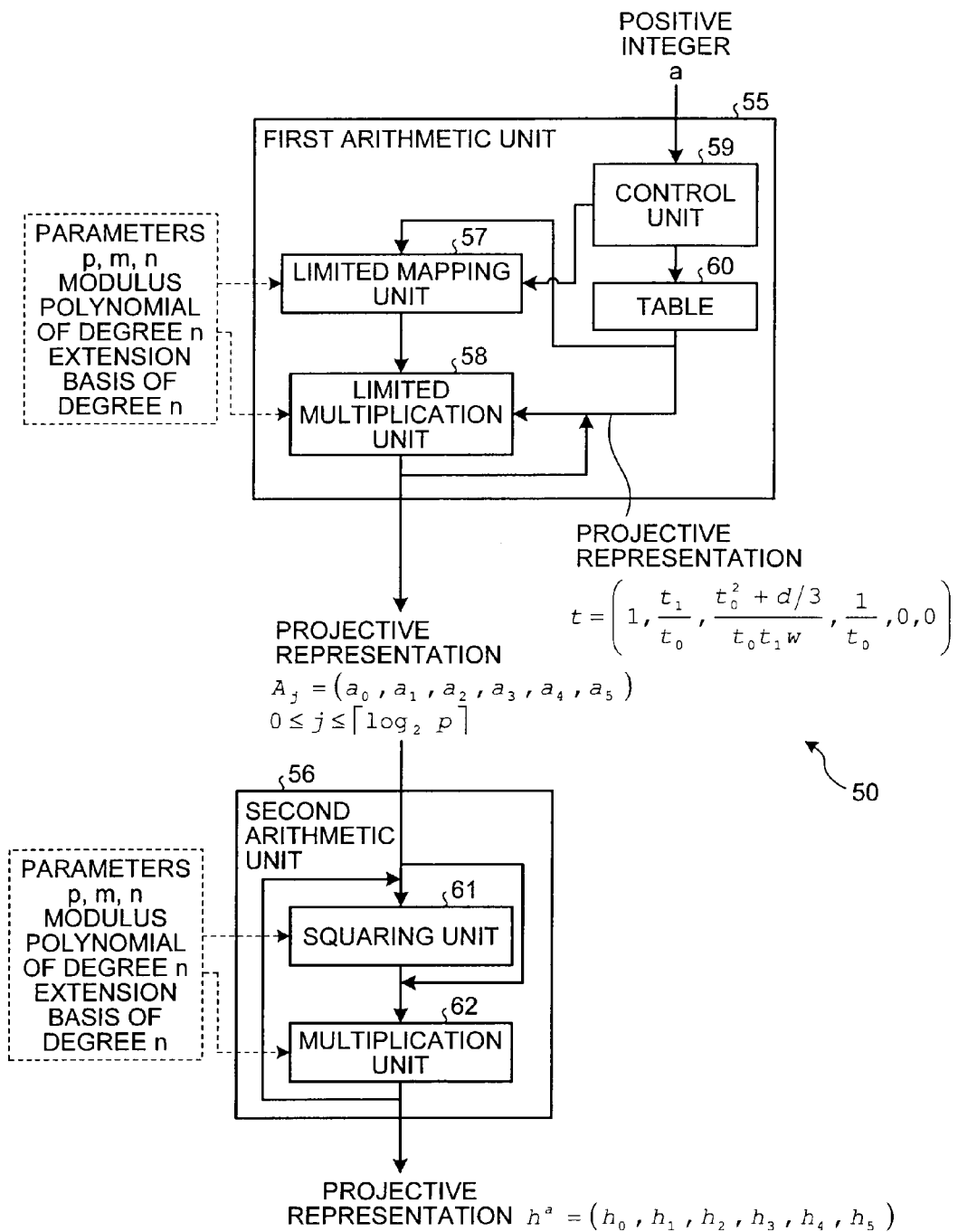

ARITHMETIC DEVICE

CROSS-REFERENCE TO RELATED APPLICATIONS

This application is a continuation of PCT international application Ser. No. PCT/JP2009/063224, filed on Jul. 23, 2009, and which designates the United States; the entire contents of which are incorporated herein by reference.

FIELD

Embodiments described herein relate generally to algebraic torus operation.

BACKGROUND

In recent years, increase in the size of cryptosystems has been an issue in public key cryptographic technologies for realizing secure communication without sharing keys in advance. In view of such background, a method for compressing the size of cryptosystems in public key cryptography has been proposed (see, for example, K. Rubin and A. Silverberg, "Torus-Based Cryptography", CRYPTO 2003, LNCS 2729, pp. 349-365, 2003). In this method, algebraic tori are used. Examples of methods for expressing an algebraic torus include an affine representation, a projective representation, and an extension field representation (see, for example, S. Galbraith, "Disguising Tori and Elliptic Curves", IACR e-print Archive 2006/248, http://eprint.iacr.org/2006/248). In relation to an algebraic torus, decompression mapping refers to converting a member of the algebraic torus from an affine representation to a projective representation, from a projective representation to an extension field representation, or from an affine representation to an extension field representation. Compression mapping refers to converting a member of the algebraic torus from an extension field representation to a projective representation, from a projective representation to an affine representation or from an extension field representation to an affine representation. In algebraic torus-based public key cryptography, in steps of key generation, encryption and decryption, affine representations are used for input and output and extension field representations are used for arithmetic operation (see, for example, "Torus-Based Cryptography"). In view of calculation costs, it is known that the calculation cost for compression mapping and decompression mapping is low when projective representations are used for arithmetic operation (see, for example, T. Yonemura et al., "How to Construct the Cramer-Shoup Encryption Scheme on Algebraic Tori", Proceedings of Computer Security Symposium, 2008). The arithmetic operation of the projective representations, however, has been basically performed similarly to that of the extension field representation (see, for example, T. Isogai et al., "Evaluation of Exponentiation on Algebraic Tori", 2009 Symposium on Cryptography and Information Security, 2009).

Arithmetic operation of members of algebraic tori is required in public key cryptography, a key sharing scheme and a digital signature scheme realized by using algebraic tori. Specific examples of the arithmetic operation include multiplication, squaring, Frobenius mapping, inversion, and exponentiation. Calculation of exponentiation particularly takes much time. In the technology of "Evaluation of Exponentiation on Algebraic Tori", calculation of exponentiation is performed by using projective representations and by combining multiplication, squaring and Frobenius mapping, which is disadvantageous in that the calculation cost of multiplication that constitutes a large part of the calculation cost of exponentiation is high.

BRIEF DESCRIPTION OF THE DRAWINGS

FIG. 16 is a diagram illustrating a functional configuration of an arithmetic device according to the eleventh embodiment.

DETAILED DESCRIPTION

Figure 1:
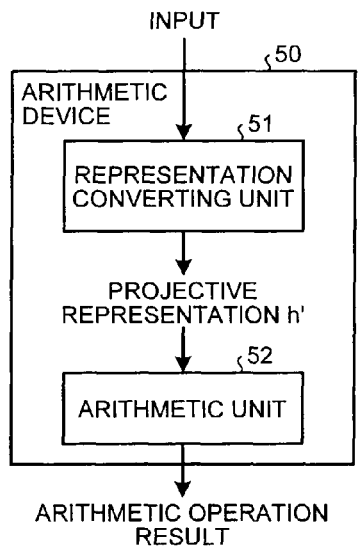
FIG. 1 is a diagram illustrating a functional configuration of an arithmetic device according to a first embodiment.

In general, according to one embodiment, an arithmetic device for performing algebraic torus operation to which either one of a set of n elements $(h_0, h_1, \ldots, h_{n-1})$ ($h_i$: a member of a finite field $F_{p^m}$, $0 \leq i \leq n-1$) representing a member g of an n-th degree algebraic torus $T_n(F_{p^m})$ (n: positive integer, p: prime number, m: positive integer) in a projective representation and a set of $\phi(n)$ elements $(c_0, c_1, \ldots, c_{\phi(n)-1})$ ($c_i$: a member of the finite field $F_{p^m}$, $0 \leq i \leq \phi(n)-1$, $\phi(x)$: Euler function) represented by an affine representation is input, the arithmetic device includes a representation converting unit configured to convert either one of the set of n elements $(h_0, h_1, h_{n-1})$ and the set of $\phi(n)$ elements $(c_0, c_1, c_{\phi(n)-1})$ into a set of n elements $(h'_0, h'_1, h'_{n-1})$ ($h'_i$: a member of the finite field $F_{p^m}$, $0 \leq i \leq n-1$) in which at least one element is a zero element "0" or an identity element "1" out of n elements representing the member g of the n-th degree algebraic torus $T_n(F_{p^m})$ in a limited projective representation; and an arithmetic unit configured to omit part of $F_{p^m}$ operation that is arithmetic operation in a finite field $F_{p^{mn}}$ based on a fact that an element in the set of n elements $(h'_0, h'_1, \ldots, h'_{n-1})$ represented by the limited projective representation is a zero element "0" or an identity element "1" when performing the $F_{p^{mn}}$ operation in combination with the $F_{p^m}$ operation.

[First Embodiment]

First, mathematical preparation for arithmetic operation of an algebraic torus according to this embodiment will be described. A finite field over which an algebraic torus $T_n$ is defined is represented by $F_{p^m}$. Here, p is a prime number, and n and m are positive integers. Tree symbol "^" represents exponentiation, and p^m represents p raised to the m-th power. $F_{p^m}$ represents a finite field whose number of elements is p^m. An algebraic torus $T_n(F_{p^m})$ is a group whose number of elements is $\Phi_n(p^m)$. Herein, $\Phi_n(X)$ is an n-th cyclotomic polynomial.

An affine representation of the algebraic torus $T_n(F_{p^m})$ is expressed by a set of $\phi(n)$ members of $F_{p^m}$. Here, $\phi(x)$ is an Euler function. A projective representation of a member g of the algebraic torus $T_n(F_{p^m})$ is expressed by the following equation 1 or an inverse of the equation 1 using a member h of $F_{p^{mn}}$.

$$g = \frac{h}{\sigma(h)} \quad \text{Equation 1}$$

In the equation, $\sigma$ is a generator of a Galois group $\text{Gal}(F_{p^{mn}}/F_{p^{mr}})$, and $\sigma = \pi^i$ir using a Frobenius map $\pi: x \to x^{(p^m)}$ and a certain i from $i=0, 1, \ldots, n/r-1$, where r is a divisor of n. The projective representation h is typically expressed by a set of n members of $F_{p^m}$.

The meaning of the equation 1 is described. According to the Hilbert's Theorem 90, the fact that a norm map of the member g of $F_{p^{mn}}$ with respect to $F_{p^{mr}}$ is 1 is equivalent to the presence of the member h of $F_{p^{mn}}$ satisfying the equation 1. On the other hand, the definition of the member g of the algebraic torus $T_n(F_{p^m})$ is that norm maps of g with respect to $F_{p^{md}}$ are all 1, where d is a divisor of n (see, for example, "Torus-Based Cryptography"). Since the equation 1 shows that a specific norm map of the member g of $F_{p^m}$ that satisfies d=r is 1, a condition that all norm maps are 1 where d≠r is satisfied has to be set on h so that h is a member g of the algebraic torus $T_n(F_{p^m})$.

For example, a case in which n=2*r, where r is a prime number other than 2, is considered. Fix a member x of $F_{p^{mn}}$, x is not a member of $F_{p^{mr}}$, so $F_{p^{mn}} = F_{p^{mr}}(x)$. Assuming that a basis of a quadratic extension is {1, x} and that a certain member of $F_{p^{mr}}$ is $\alpha$, $\beta$, h can be expressed as $h = \alpha + \beta x$. Since $\text{Gal}(F_{p^{mn}}/F_{p^{mr}}) = \{1, \pi\}$, $\sigma = \pi$ it is obtained. The members of $F_{p^m}$ do not change even when $\sigma$ is applied thereto. In this case, the projective representation is as in the following equation 2 or an inverse of the equation 2.

$$g = \frac{\alpha + \beta x}{\alpha + \beta \sigma(x)} \quad \text{Equation 2}$$

A condition that a norm map with respect to $F_{p^{m2}}$ is 1 is set on h so that h is a member g of the algebraic torus $T_n(F_{p^m})$. ($\alpha\delta$, $\beta\delta$) obtained by multiplying such ($\alpha$, $\beta$) by the member $\delta$ of $F_{p^m}$ also represents a member g of the same algebraic torus. The expression is called projective representation because of this property. Similarly, a projective representation in which the role of 2 and that of r are replaced with each other and a projective representation for n that is not expressed as n=2*r can be formed.

Calculation costs of inversion of $F_{p^m}$, multiplication of $F_{p^m}$, squaring of $F_{p^m}$, and Frobenius mapping of $F_{p^m}$ are represented by I, M, S and F, respectively. A calculation cost of multiplication of a constant belonging to $F_{p^m}$ and a member of $F_{p^m}$ is represented by B. The number of Bs and the calculation costs vary depending on the manner in which parameters are defined.

Next, a configuration of an arithmetic device according to this embodiment will be described. The arithmetic device includes a controlling unit such as a CPU (central processing unit) configured to control the entire device, a main storage unit such as a ROM (read only memory) and a RAM (random access memory) configured to store various data and various programs, an auxiliary storage unit such as a HDD (hard disk drive) and a CD (compact disk) drive configured to store various data and various programs, a communication I/F (interface) configured to control communication of external devices, and a bus that connects these units, which is a hardware configuration using a common computer system.

Description will be made in detail on various functions implemented by executing various programs stored in the main storage unit and the auxiliary storage unit by the CPU of the arithmetic device with such a hardware configuration. FIG. 1 is a diagram illustrating a functional configuration of an arithmetic device 50 according to this embodiment. As illustrated in FIG. 1, the arithmetic device 50 includes a representation converting unit 51 and an arithmetic unit 52. A member g that is a member of the algebraic torus and represented by a projective representation is input to the representation converting unit 51, and the representation converting unit 51 converts the input projective representation to a projective representation (referred to as a limited projective representation) with lower calculation cost of arithmetic operation. The member of the algebraic torus $T_n(F_{p^m})$ (n: positive integer, p: prime number, m: positive integer) input to the representation converting unit 51 is represented by g, the projective representation corresponding to g is represented by h, and the limited projective representation is represented by h'. The projective representation h is generally a member of $F_{p^m}$. The projective representation h is represented by $(h_0, h_1, \ldots, h_{n-1})$ ($h_i$: a member of the finite field $F_{p^m}$, $0 \le i \le n-1$, r: a divisor of n) including n elements, and satisfies the condition that all the norm maps of $F_{p^{mn}}$ with respect to $F_{p^{md}}$ (d: a divisor of n) are 1. The limited projective representation h' defines at least one element as a member of a subfield $F_{p^{m'}}$, when the limited projective representation h' is represented by a set of n members of $F_{p^m}$. Here, m' is a divisor of m and different from m. Such a limited projected representation h' can be obtained by multiplying the projective representation h by a member $\delta$ of $F_{p^{mr}}$, and expressed as a projective representation $(h'_0, h'_1, \ldots, h'_{n-1})$ including n elements. The limited projective representation h' also satisfies the condition that all the norm maps of with respect to $F_{p^{md}}$ are 1. For example, the representation converting unit 51 converts a set of n elements $(h_0, h_1, h_{n-1})$ ($h_i$: a member of the finite field $F_{p^m}$, $0 \le i \le n-1$) that is a projective representation of the member g of the n-th degree algebraic torus $T_n(F_{p^m})$ (n: positive integer, p: prime number, m: positive integer) into a limited projected representation expressed by a set of n elements $(h'_0, h'_1, \ldots, h'_{n-1})$ ($h'_i$: a member of the finite field $F_{p^m}$, $0 \le i \le n-1$) in which at least one element is a zero element 0 or an identity element 1.

The arithmetic unit 52 performs arithmetic operation limited to members of the subfield $F_{p^{m'}}$, by using part of the elements of the limited projective representation h' resulting from the conversion by the representation converting unit 51 or all the elements including the members of the subfield $F_{p^{m'}}$. For example, when the arithmetic unit 52 performs $F_{p^{mn}}$, operation that is arithmetic operation of the finite field in combination with $F_{p^m}$ operation that is arithmetic operation of the finite field $F_{p^m}$ by using the limited projective representation h' resulting from the conversion by the representation converting unit 51, part of the $F_{p^\wedge m}$ operation is omitted based on the fact that an element in the set of n elements (h'$_0$, h'$_1$, . . . h'$_{n-1}$) of the limited projective representation h' is the zero element 0 or the identity element 1. Examples of the arithmetic operation include multiplication, squaring, Frobenius mapping, and exponentiation.

Figure 2:
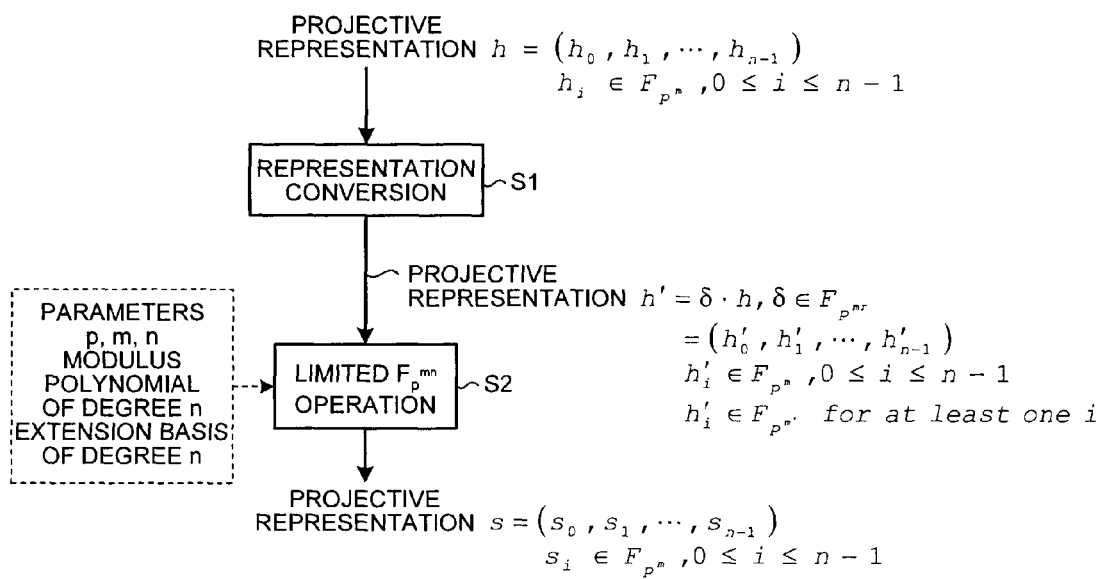
FIG. 2 is a flowchart illustrating procedures of arithmetic processing according to the first embodiment.

Next, procedures of arithmetic processing performed by the arithmetic device 50 according to this embodiment will be described. FIG. 2 is a flowchart illustrating the procedures of arithmetic processing according to this embodiment. In step S1, the representation converting unit 51 converts the projective representation h of the equation 1 representing the member g of the algebraic torus $T_n(F_{p^\wedge m})$ into the projective representation h'. In step S2, when performing the operation in combination with the $F_{p^\wedge m}$ operation by using the limited projective representation h' resulting from the conversion in step S1, the arithmetic unit 52 omits part of the $F_{p^\wedge m}$ operation based on the fact that an element in the set of n elements (h'$_0$, h'$_1$, . . . , h$_{n-1}$) of the limited projective representation h' is the zero element 0 or the identity element 1.

As described above, the calculation cost of the arithmetic operation of an algebraic torus can be reduced by converting an input projective representation into a limited projective representation. For example, with the technology of "Evaluation of Exponentiation on Algebraic Tori", it has been difficult to reduce the calculation cost since general $F_{p^\wedge mn}$ operation is performed for the arithmetic operation using projective representations. According to this embodiment, however, particularly when the conversion from a projective representation into a limited projective representation is performed as precomputation before performing arithmetic operation that is main computation, the calculation cost of the main computation can be reduced as will be described in the embodiments below. Accordingly, public key encryption, key sharing and digital signature of members of an algebraic torus that are implemented by using the arithmetic device can be performed at higher speed.

[Second Embodiment]

Next, a second embodiment of an arithmetic device will be described. Parts that are the same as those in the first embodiment described above will be described using the same reference numerals or description thereof will not be repeated.

In this embodiment, a case in which n=2*r where r is a prime number other than 2 is satisfied in the algebraic torus described in the first embodiment above will be described. In addition, an example in which multiplication is used as the arithmetic operation will be described. The functional configuration of an arithmetic device 50 according to this embodiment is substantially the same as that illustrated in FIG. 1. Members of an algebraic torus $T_n(F_{p^\wedge m})$ input to the representation converting unit 51 are represented by g1 and g2, and projective representations of the equation 2 corresponding to the members g1 and g2 are represented by h1 and h2, where h1=$\alpha$1+$\beta$1 x and h2=$\alpha$2+$\beta$2 x. The projective representations h1 and h2 are expressed as ($\alpha$1, $\beta$1) and ($\alpha$2, $\beta$2), respectively. The projective representations h1 and h2 each have n elements. The representation converting unit 51 converts at least one of such projective representations h1 and h2 into a limited projective representation h1' or h2' with lower calculation cost of arithmetic operation. An example in which both of the two projective representations h1 and h2 are converted into the limited projective representations h1' and h2', respectively, will be described here. Specifically, the representation converting unit 51 converts the projective representation h1 into the limited projective representation h1' of a set of n elements in which at least one element is a zero element 0 or a identity element 1, and converts the projective representation h2 into the limited projective representation h2' of a set of n elements in which at least one element is a zero element 0 or an identity element 1. The arithmetic unit 52 performs multiplication (referred to as limited $F_{p^\wedge mn}$ multiplication) omitting part of $F_{p^\wedge m}$ operation based on the fact that an element of the n elements is a zero element 0 or an identity element 1 using the limited projective representations h1' and h2' as the multiplication of the members g1 and g2.

The arithmetic operation using multiplication as an example will be described here by comparison with a conventional technology. With the conventional technology, the multiplication of the members g1 and g2 is performed according to the Karatsuba's method or the Toom-Cook method where x=0, 1, ∞ by equations 3 and 4, and the multiplication result ($\alpha$3, $\beta$3) is obtained. Let minimal polynomial of x over Fp^mr be $f_2(x)$. We call it a modulus polynomial of a quadratic extension. The equations 3 and 4 represent an example in which a modulus polynomial of a quadratic extension is $f_2(x)=x^2-d$. The same modulus polynomial is used in examples below unless otherwise specified. A major part of the calculation cost of multiplication of an algebraic torus is three multiplications of $F_{p^\wedge m}$ and one multiplication of a constant of $F_{p^\wedge mr}$.

input:($\alpha$1,$\beta$1),($\alpha$2,$\beta$2),output:($\alpha$3,$\beta$3)

$t1:=\alpha 1 \cdot \alpha 2; t2:=\beta 1 \cdot \beta 2; t3:=(\alpha 1+\beta 1) \cdot (\alpha 2+\beta 2);$ $$\alpha 3:=t1+d \cdot t2 \qquad \text{Equation 3;}$$

$$\beta 3:=t3-t1-t2 \qquad \text{Equation 4;}$$

Figure 3:
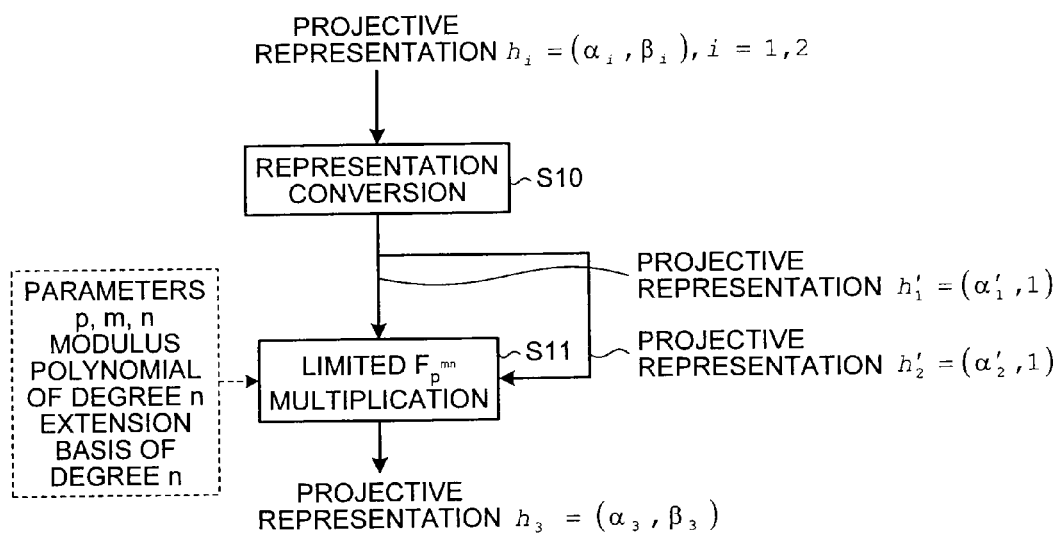
FIG. 3 is a flowchart illustrating procedures of arithmetic processing according to a second embodiment.

FIG. 3 is a flowchart illustrating procedures of arithmetic processing according to this embodiment. In this embodiment, the representation converting unit 51 converts the input projective representations h1 and h2 into the limited projective representations h1' and h2' by equations 5 and 6 in step S10. The limited projective representation h1' is represented by ($\alpha$1', 1)=($\alpha$1/$\beta$1, 1), and the limited projective representation h2' is represented by ($\alpha$2', 1)=($\alpha$2/$\beta$2, 1). In step S11, the arithmetic unit 52 performs multiplication of the members g1 and g2 by equations 7 and 8 using the projective representations h1' and h2' resulting from the conversion in step S10 to perform the limited $F_{p^\wedge mn}$ multiplication, and obtains the multiplication result ($\alpha$3, $\beta$3).

A major part of the calculation cost of such multiplication of an algebraic torus is one multiplication of $F_{p^\wedge mr}$, which is reduced as compared to three multiplications of $F_{p^\wedge mr}$ and one multiplication of a constant of $F_{p^\wedge mr}$ of the conventional calculation cost described above. A major part of the calculation cost of representation conversion is two inversions of $F_{p^\wedge mr}$ and two multiplications of $F_{p^\wedge mr}$. When multiplication of algebraic torus is divided into precomputation and main computation, that is, when the representation conversion is performed as precomputation and the multiplication is performed as the main computation, the total calculation cost including the precomputation and the main computation increases while the calculation cost of the main computation is reduced to about one third as compared to a case where the representation conversion is not performed.

input:($\alpha$1,$\beta$1),($\alpha$2,$\beta$2),output:($\alpha$3,$\beta$3)

$$(\alpha 1',1):=(\alpha 1/\beta 1,1) \qquad \text{Equation 5;}$$

$$(\alpha 2',1):=(\alpha 2/\beta 2,1) \qquad \text{Equation 6;}$$

$t1':=\alpha 1' \cdot \alpha 2';$ $$\alpha 3 := t1' + d \quad \text{Equation 7;}$$

$$\beta 3 := \alpha 1' + \alpha 2' \quad \text{Equation 8;}$$

Note that the representation converting unit 51 is configured to convert both of the projective representations h1 and h2 into limited projective representations by the equations 5 and 6 in the example described above. However, even when the representation converting unit 51 converts only either one of the projective representations into a limited projective representation, the arithmetic unit 52 can perform the limited $F_{p^{mn}}$ multiplication as the multiplication of g1 and g2 by using the limited projective representation corresponding to the projective representation converted by the representation converting unit 51 and the projective representation that is not converted of the two input projective representations. Moreover, although both of the projective representations h1 and h2 are converted by the same conversion equation, these projective representations may alternatively be converted by different conversion equations. As an example of the different conversion equation, the projective representation h1 may be converted into $(\alpha 1', b1) = (\alpha 1 \times N(\beta 1)/\beta 1, N(\beta 1))$ by using a norm map N. Note that $N(\beta 1)/\beta 1$ can be obtained in the course of calculating the norm map, and an inverse need not be calculated. As described above, if a second element of a projective representation to be converted is a member of a subfield instead of 1, the calculation cost of the representation conversion is decreased while the calculation cost of the arithmetic operation is increased as compared to a case where the second element is 1. In addition, the roles of the first element and the second element may be replaced with each other in the equations 5 and 6. Thus, a projective representation h, for example, may be converted into $(1, \beta 1) = (1, \beta 1/\alpha 1)$.

[Third Embodiment]

Next, a third embodiment of an arithmetic device will be described. Parts that are the same as those in the first embodiment or the second embodiment described above will be described using the same reference numerals or description thereof will not be repeated.

In this embodiment, a case in which n=2*r where r is a prime number other than 2 is satisfied in the algebraic torus described in the first embodiment above will be described. In addition, an example in which Frobenius mapping $\phi^{\wedge}: x \to x^{\wedge}(p^{\wedge}u)$ is used as the arithmetic operation will be described. The functional configuration of an arithmetic device 50 according to this embodiment is substantially the same as that illustrated in FIG. 1. A member of an algebraic torus $T_n(F_{p^m})$ input to the representation converting unit 51 is represented by g1, a projective representation corresponding to the member g1 is represented by h1, h1=α1+β2 x, and u is a positive integer. The projective representation h1 is expressed as (α1, β1). The projective representation h1 has n elements. The representation converting unit 51 converts such a projective representation h1 into a limited projective representation h1' of a set of n elements in which at least one element is an identity element 1. The arithmetic unit 52 performs Frobenius mapping (referred to as limited $F_{p^{mn}}$ Frobenius mapping) omitting part of $F_{p^m}$ operation based on the fact that an element of the n elements is an identity element 1 using the limited projective representation h1' as the Frobenius mapping of the member g1.

The arithmetic operation using Frobenius mapping as an example will be described here by comparison with a conventional technology. With the conventional technology, a Frobenius map $\phi^{\wedge}u(g1)$ of the member g1 is calculated by equations 9 and 10, and the mapping result (α3, β3) is obtained. A major part of the calculation cost of Frobenius mapping of an algebraic torus is two Frobenius mappings of $F_{p^{mr}}$ and one multiplication of a constant of $F_{p^{mr}}$.

input:(α1,β1),u,output:(α3,β3)

$$t1 := \alpha 1^{p^u}; t2 := \beta 1^{p^u};$$

$$\alpha 3 := t1 \quad \text{Equation 9;}$$

$$\beta 3 := t2 \cdot d^{(p^u - 1)/2} \quad \text{Equation 10;}$$

Figure 4:
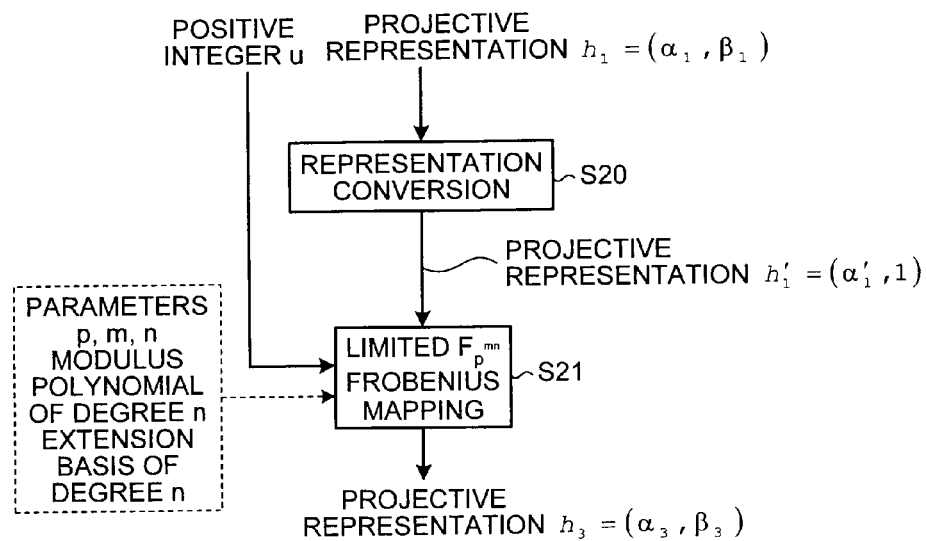
FIG. 4 is a flowchart illustrating procedures of arithmetic processing according to a third embodiment.

FIG. 4 is a flowchart illustrating procedures of arithmetic processing according to this embodiment. In this embodiment, the representation converting unit 51 converts the input projective representation h1 into a limited projective representation h1' by an equation 11 in step S20. The limited projective representation h1' is represented by $(\alpha 1', 1) = (\alpha 1/\beta 1, 1)$. In step S21, the arithmetic unit 52 calculates the Frobenius map of the member g1 by equations 12 and 13 using the limited projective representation h1' resulting from the conversion in step S20 to perform the limited $F_{p^{mn}}$ Frobenius mapping, and obtains the mapping result (α3, β3).

A major part of the calculation cost of such Frobenius mapping of an algebraic torus is one Frobenius mapping of $F_{p^{mr}}$, which is reduced as compared to two Frobenius mappings of $F_{p^{mr}}$ and one multiplication of a constant of $F_{p^{mr}}$ of the conventional calculation cost described above. A major part of the calculation cost of representation conversion is one inversion of $F_{p^{mr}}$ and one multiplication of $F_{p^{mr}}$. When Frobenius mapping of an algebraic torus is divided into precomputation and main computation, that is, when the representation conversion is performed as precomputation and calculation of a Frobenius map is performed as the main computation, the total calculation cost including the precomputation and the main computation increases while the calculation cost of the main computation is reduced as compared to a case where the representation conversion is not performed.

input:(α1,β1),u,output:(α3,β3)

$$(\alpha 1', 1) := (\alpha 1/\beta 1, 1) \quad \text{Equation 11;}$$

$$t1' := \alpha 1'^{p^u};$$

$$\alpha 3 := t1' \quad \text{Equation 12;}$$

$$\beta 3 := d^{(p^u - 1)/2} \quad \text{Equation 13;}$$

Note that although the representation converting unit 51 converts the projective representation h1 into the limited projective representation h1' by the equation 11 in the example described above, the projective representation h1 may alternatively be converted into $(\alpha 1', b1) = (\alpha 1 \times N(\beta 1)/(\beta 1, N(\beta 1))$ by using a norm map N, for example. Note that $N(\beta 1)/\beta 1$ can be obtained in the course of calculating the norm map, and an inverse need not be calculated. As described above, if a second element of a projective representation to be converted is a member of a subfield instead of 1, the calculation cost of the representation conversion is decreased while the calculation cost of the arithmetic operation is increased as compared to a case where the second element is 1. In addition, the roles of the first element and the second element may be replaced with each other in the equation 11.

[Fourth Embodiment]

Next, a fourth embodiment of an arithmetic device will be described. Parts that are the same as those in the first embodiment to the third embodiment described above will be described using the same reference numerals or description thereof will not be repeated.

Figure 5:
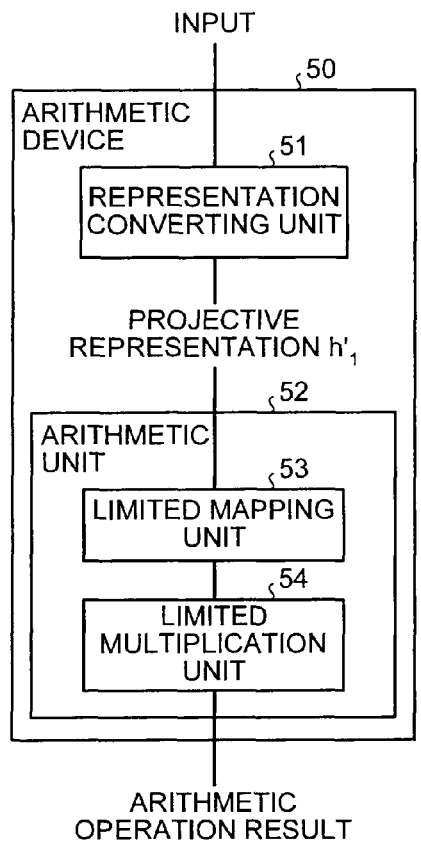
FIG. 5 is a diagram illustrating a functional configuration of an arithmetic device according to a fourth embodiment.

In this embodiment, a case in which n=2*r where r is a prime number other than 2 is satisfied in the algebraic torus described in the first embodiment above will be described. In addition, an example in which $(1+p\hat{\ }u)$-th power is used as the arithmetic operation will be described. FIG. 5 is a diagram illustrating a functional configuration of an arithmetic device 50 according to this embodiment. An arithmetic unit 52 of the arithmetic device 50 includes a limited mapping unit 53 and a limited multiplication unit 54. A member of an algebraic torus $T_n(F_{p\hat{\ }m})$ input to the representation converting unit 51 is represented by g1, a projective representation corresponding to the member g1 is represented by h1, $h1=\alpha 1+\beta 1\ x$, and u is a non-negative integer. The projective representation h1 is expressed as $(\alpha 1, \beta 1)$. The $(1+p\hat{\ }u)$-th power is such that the $(1+p\hat{\ }u)$-th power of the member g1 is multiplication of the Frobenius map $\phi\hat{\ }u(g1)$ and g1. It is assumed here that $g2=\phi\hat{\ }u(g1)$. A projective representation corresponding to the member g2 is represented by h2, and $h2=\alpha 2+\beta 2\ x$. The projective representations h1 and h2 each have n elements. The representation converting unit 51 converts such a projective representation h1 to a limited projective representation h1' of a set of n elements in which at least one element is an identity element 1. The arithmetic unit 52 performs arithmetic operation omitting part of $F_{p\hat{\ }m}$ operation with the $(1+p\hat{\ })$-th power of the member g1 as multiplication of the Frobenius map $\phi\hat{\ }u(g1)$ and g1 and using the limited projective representations h1' and h2'. Specifically, the limited mapping unit 53 of the arithmetic unit 52 performs Frobenius mapping (limited $F_{p\hat{\ }mn}$ Frobenius mapping) omitting part of $F_{p\hat{\ }m}$ operation by using the limited projective representation h1' to calculate the Frobenius map $\phi\hat{\ }u(g1)$ of the member g1, and obtains the limited projective representation h2'. The limited multiplication unit 54 performs multiplication (limited $F_{p\hat{\ }mn}$ multiplication) omitting part of the $F_{p\hat{\ }m}$ operation by using the limited projective representations h1' and h2'.

The arithmetic operation using the $(1+p\hat{\ }u)$-th power as an example will be described here by comparison with a conventional technology. With the conventional technology, the Frobenius map $\phi\hat{\ }u(g1)$ of the member g1 is calculated by the equations 9 and 10 and the mapping result $(\alpha 3, \beta 3)$ is obtained, and further, the multiplication is performed by the equations 3 and 4 where $g2=\phi\hat{\ }u(g1)$ and the multiplication result $(\alpha 3, \beta 3)$ is obtained. A major part of the calculation cost of the $(1+p\hat{\ }u)$-th power of an algebraic torus is three multiplications of $F_{p\hat{\ }mr}$, two multiplications of a constant of $F_{p\hat{\ }mr}$ and two Frobenius mappings of $F_{p\hat{\ }mr}$.

Figure 6:
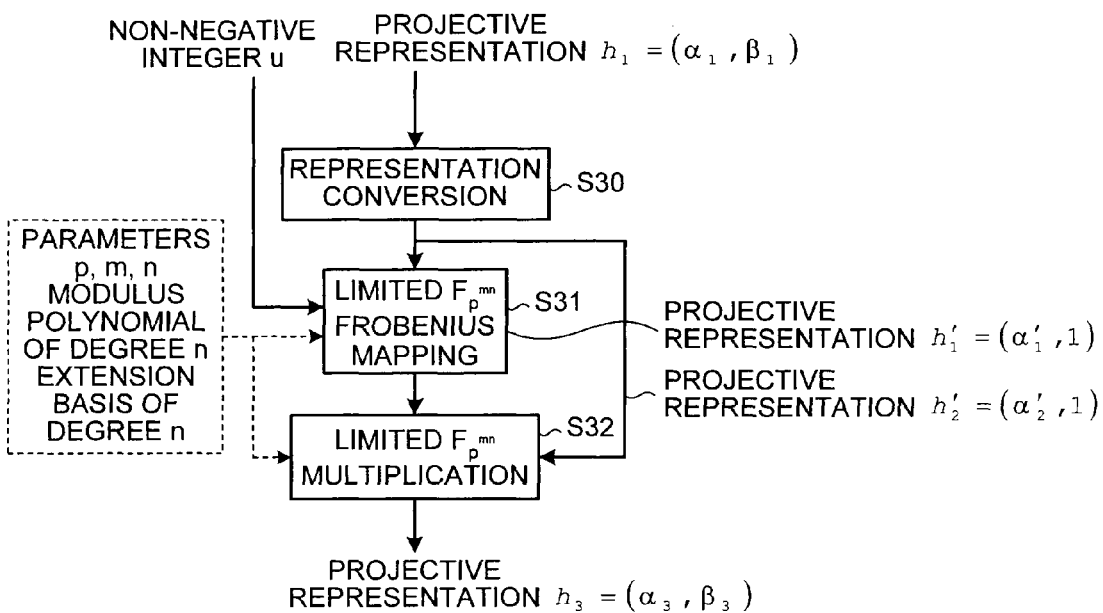
FIG. 6 is a flowchart illustrating procedures of arithmetic processing according to the fourth embodiment.

FIG. 6 is a flowchart illustrating procedures of arithmetic processing according to this embodiment. In this embodiment, the representation converting unit 51 converts the input projective representation h1 into a limited projective representation h1' by the equation 5 in step S30. In step S31, the limited mapping unit 53 of the arithmetic unit 52 performs the limited Frobenius mapping by calculating the Frobenius map by the equations 12 and 13. In step S32, the limited multiplication unit 54 performs the multiplication where $g2=\phi\hat{\ }u(g1)$ by the equations 7 and 8 to perform the limited $F_{p\hat{\ }mn}$ multiplication, and obtains the multiplication result $(\alpha 3, \beta 3)$. Note that if the second element is 1 in the Frobenius mapping result $(\alpha 3, \beta 3)$ obtained by the equations 12 and 13, the representation conversion by the equations 5 and 6 for performing calculation using the equations 7 and 8 need not be performed.

A major part of the calculation cost of such $(1+p\hat{\ }u)$-th power of an algebraic torus is one multiplication of $F_{p\hat{\ }mr}$ and one Frobenius mapping of $F_{p\hat{\ }mr}$, which is reduced as compared to three multiplications of $F_{p\hat{\ }mr}$, two multiplications of a constant of $F_{p\hat{\ }mr}$, and two Frobenius mappings of $F_{p\hat{\ }mr}$ of the conventional calculation cost described above. A major part of the calculation cost of representation conversion is one inversion of $F_{p\hat{\ }mr}$ and one multiplication of $F_{p\hat{\ }mr}$. When $(1+p\hat{\ }u)$-th power of an algebraic torus is divided into precomputation and main computation, that is, when the representation conversion is performed as precomputation and the calculation of the $(1+p\hat{\ }u)$-th power is performed as the main computation, the total calculation cost including the precomputation and the main computation increases while the calculation cost of the main computation is reduced to about one third as compared to a case where the representation conversion is not performed.

Note that although the calculation cost is that of a case where the representation converting unit 51 converts both of the projective representations h1 and h2 into limited projective representations, even when the representation converting unit 51 converts only either one of the projective representations into a limited projective representation, the arithmetic unit 52 can perform the arithmetic operation omitting part of the $F_{p\hat{\ }m}$ operation as the arithmetic operation of g1 and g2 by using the limited projective representation corresponding to the projective representation converted by the representation converting unit 51 and the projective representation that is not converted of the two input projective representations. Moreover, although both of the projective representations h1 and h2 are converted by the same conversion equation, these projective representations may alternatively be converted into limited projective representations by different conversion equations. As an example of the different conversion equation, the projective representation h1 may be converted into $(\alpha 1', b1)=(\alpha 1 \times N(\beta 1)/\beta 1, N(\beta 1))$ by using a norm map N. Note that $N(\beta 1)/\beta 1$ can be obtained in the course of calculating the norm map, and an inverse need not be calculated. As described above, if a second element of a projective representation to be converted is a member of a subfield instead of 1, the calculation cost of the representation conversion is decreased while the calculation cost of the arithmetic operation is increased as compared to a case where the second element is 1. In addition, the roles of the first element and the second element may be replaced with each other in the equations 5 and 6.

[Fifth Embodiment]

Next, a fifth embodiment of an arithmetic device will be described. Parts that are the same as those in the first embodiment to the fourth embodiment described above will be described using the same reference numerals or description thereof will not be repeated.

In this embodiment, a case in which n=2*r where r is a prime number other than 2 is satisfied in the algebraic torus described in the first embodiment above will be described. In addition, an example in which $(p\hat{\ }u_1+p\hat{\ }u_2+\ldots+p\hat{\ }u_k)$-th power is used as the arithmetic operation will be described. The functional configuration of an arithmetic device 50 according to this embodiment is substantially the same as that illustrated in FIG. 5. A member of an algebraic torus $T_n(F_{p\hat{\ }m})$ input to the representation converting unit 51 is represented by g1, a projective representation corresponding to the member g1 is represented by h1, $h1=\alpha 1+\beta 1\ x$, and $u_1, u_2, \ldots, u_k$ are non-negative integers. The projective representation h1 is expressed as $(\alpha 1, \beta 1)$. The $(p\hat{\ }u_1+p\hat{\ }u_2+\ldots+p\hat{\ }u_k)$-th power is calculated by combining Frobenius mapping $\phi\hat{\ }u_1, \phi\hat{\ }u_2, \ldots, \phi\hat{\ }u_k$ and multiplication. The projective representation h1 has n elements. The representation converting unit 51 converts such a projective representation h1 to a limited projective representation h1' of a set of n elements in which at least one element is an identity element 1. The arithmetic unit 52 performs arithmetic operation omitting part of $F_{p\hat{\ }m}$ operation using the limited projective representation h1' as the $(p\hat{\ }u_1+p\hat{\ }u_2+\ldots+p\hat{\ }u_k)$-th power of the member g1. Specifically, the limited mapping unit 53 of the arithmetic unit 52 performs limited Frobenius mapping by using the limited projective representation h1' to calculate the Frobenius maps $\phi\hat{\ }u_1$, $\phi\hat{\ }u_2$, $\hat{\ }u_k$ of the member g1, and obtains the limited projective representation h2'. The limited multiplication unit 54 performs multiplication (limited $F_{p\hat{\ }mn}$ multiplication) omitting part of $F_{p\hat{\ }m}$ operation by using the limited projective representation h2'.

The arithmetic operation using the $(p\hat{\ }u_1+p\hat{\ }u_2+\ldots+p\hat{\ }u_k)$-th power as an example will be described here by comparison with a conventional technology. With the conventional technology, the $(p\hat{\ }u_1+p\hat{\ }u_2+\ldots+p\hat{\ }u_k)$-th power of the member g1 is calculated by the equations 9, 10, 3 and 4 and the exponentiation result ($\alpha 3$, $\beta 3$) is obtained. A major part of the calculation cost of the $(p\hat{\ }u_1+p\hat{\ }u_2+\ldots+p\hat{\ }u_k)$-th power of an algebraic torus is $3(k-1)$ multiplications of $F_{p\hat{\ }mr}$, $2(k-1)$ multiplications of a constant of $F_{p\hat{\ }mr}$ and 2k Frobenius mappings of $F_{p\hat{\ }mr}$.

Figure 7:
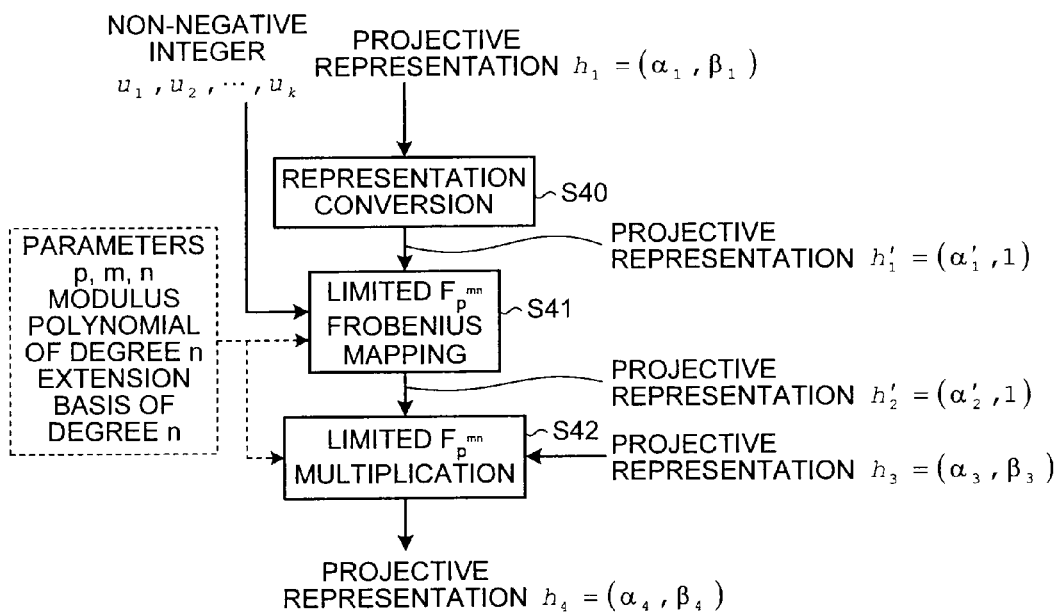
FIG. 7 is a flowchart illustrating procedures of arithmetic processing according to a fifth embodiment.

FIG. 7 is a flowchart illustrating procedures of arithmetic processing according to this embodiment. In this embodiment, the representation converting unit 51 converts the input projective representation h1 into the limited projective representation h1' by the equation 11 in step S40. The projective representation h1' is represented by $(\alpha 1', \beta 1)=(\alpha 1/\beta 1, 1)$. In steps S41 and S42, the arithmetic unit 52 calculates a first multiplication of the $(p\hat{\ }u_1+p\hat{\ }u_2+\ldots+p\hat{\ }u_k)$-th power of the member g1 using such a limited projective representation h1' by the equations 12, 13, 7 and 8, and obtains the multiplication result ($\alpha 3$, $\beta 3$). Note that if the second element is 1 in the Frobenius mapping result ($\alpha 3$, $\beta 3$) obtained by the equations 12 and 13, the representation conversion by the equations 5 and 6 for performing calculation using the equations 7 and 8 need not be performed. In the second and subsequent multiplications, an input obtained from the output of Frobenius mapping out of the two inputs need not be subjected to representation conversion. In addition, the calculation cost is reduced even if the representation conversion of the input obtained from the output of multiplication is not performed.

A major part of the calculation cost of such $(p\hat{\ }u_1+p\hat{\ }u_2+\ldots+p\hat{\ }u_k)$-th power of an algebraic torus is $(2k-3)$ multiplications of $F_{p\hat{\ }mr}$, $(k-2)$ multiplications of a constant of $F_{p\hat{\ }mr}$, and k Frobenius mappings of $F_{p\hat{\ }mr}$, which is reduced as compared to $3(k-1)$ multiplications of $F_{p\hat{\ }mr}$, $2(k-1)$ multiplications of a constant of $F_{p\hat{\ }mr}$, and 2k Frobenius mappings of $F_{p\hat{\ }mr}$ of the conventional calculation cost described above. A major part of the conversion cost of representation conversion is one inversion of $F_{p\hat{\ }mr}$ and one multiplication of $F_{p\hat{\ }mr}$. When the $(p\hat{\ }u_1+p\hat{\ }u_2+\ldots+p\hat{\ }u_k)$-th power of an algebraic torus is divided into precomputation and main computation, that is, when the representation conversion is performed as precomputation and the calculation of the $(p\hat{\ }u_1+p\hat{\ }u_2+\ldots+p\hat{\ }u_k)$-th power is performed as the main computation, the total calculation cost including the precomputation and the main computation increases by one inversion of $F_{p\hat{\ }mr}-\{(k-1)$ multiplications of $F_{p\hat{\ }mr}+k$ multiplications of a constant of $F_{p\hat{\ }mr}+k$ Frobenius mappings of $F_{p\hat{\ }mr}\}$ as compared to a case where the representation conversion is not performed. In other words, with k satisfying one inversion of $F_{p\hat{\ }mr}<\{(k-1)$ multiplications of $F_{p\hat{\ }mr}+k$ multiplications of a constant of $F_{p\hat{\ }mr}$ and k Frobenius mappings of $F_{p\hat{\ }mr}\}$, the total calculation cost is reduced and the calculation cost of the main computation is also reduced to about two thirds.

Note that although the calculation cost is that of a case where the representation converting unit 51 converts the projective representation into a limited projective representation by either one of the equations 5 and 6 in multiplication of $F_{p\hat{\ }mr}$, even when the representation converting unit 51 performs representation conversion of the multiplication result and both into the limited projective representations, the arithmetic unit 52 can perform the arithmetic operation omitting part of the $F_{p\hat{\ }m}$ operation. Moreover, the representation converting unit 51 may convert the projective representation h1 into a limited projective presentation by a conversion equation different from the equations 5 and 6. As an example of the different conversion equation, the projective representation h1 may be converted into $(\alpha 1', b1)=(\alpha 1 \times N(\beta 1)/(\beta 1, N(\beta 1))$ by using a norm map N. Note that $N(\beta 1)/\beta 1$ can be obtained in the course of calculating the norm map, and an inverse need not be calculated. As described above, if a second element of a projective representation to be converted is a member of a subfield instead of 1, the calculation cost of the representation conversion is decreased while the calculation cost of the arithmetic operation is increased as compared to a case where the second element is 1. In addition, the roles of the first element and the second element may be replaced with each other in the equations 5 and 6.

[Sixth Embodiment]

Next, a sixth embodiment of an arithmetic device will be described. Parts that are the same as those in the first embodiment to the fifth embodiment described above will be described using the same reference numerals or description thereof will not be repeated.

In this embodiment, a case in which n=2*r where r=3 is satisfied and a modulus polynomial of a cubic extension is $f_3(y)=y\hat{\ }3-w$ in the algebraic torus described in the first embodiment above will be described. In this case, representation conversion from an affine representation $(c_0, c_1)$ into a projective representation h is expressed by an equation 14, for example.

$$(c_0, c_1) := c_0 \cdot c_1 + c_1^2 y + \frac{c_0^2 + d/3}{w} y^2 + c_1 x \qquad \text{Equation 14}$$

At least one member of the algebraic torus is input to an arithmetic device performing such arithmetic operation of an algebraic torus, and the arithmetic device performs the arithmetic operation with the projective representation. In algebraic torus-based public key cryptography, a public key or encrypted data are input and output in compressed representations, namely affine representations in steps of key generation, encryption and decryption. In this case, an input is given as an affine representation $(c_0, c_1)$ corresponding to a member g of the algebraic torus $T_n(F_{p\hat{\ }2m})$. In the conventional technique, the affine representation $(c_0, c_1)$ is converted to a projective representation $h=c_0*c_1+c_1\hat{\ }2 y+(c_0\hat{\ }2+d/3)/w y\hat{\ }2+c_1 x$. The projective representation h is expressed as $(c_0*c_1, c_1\hat{\ }2, (c_0\hat{\ }2+d/3)/w, c_1, 0, 0)$. The obtained projective representation h is expressed by a set of n (=6) members of $F_{p\hat{\ }m}$ in which two elements are 0, which is a projective representation with already low calculation cost of arithmetic operation.

In this embodiment, on the other hand, the arithmetic device 50 converts the affine representation $(c_0, c_1)$ into a limited projective representation h' with even lower calculation cost in stead of converting into the projective representation. This representation conversion is expressed by an equation 15, for example. The difference thereof from the equation 14 is that the entire projective representation of the equation 14 is multiplied by an inverse of $c_1$ so that the coefficient of x becomes 1. Note that while a first element and a second element are used to express a third element of the projective representation in the equation 15, the roles of the second element and the third element may be replaced with each other.

$$(c_0, c_1) := c_0 + c_1 y + \frac{c_0^2 + d/3}{c_1 \cdot w} y^2 + x \quad \text{Equation 15}$$

The functional configuration of the arithmetic device 50 according to this embodiment is substantially the same as that illustrated in FIG. 1. The representation converting unit 51 of the arithmetic device 50 performs the representation conversion as described above. Specifically, the representation converting unit 51 converts a set of $\phi(n)$ elements $(c_0, c_1, \ldots, c_{\phi(n)-1})$ ($c_i$: a member of the finite field $F_{p^m}$, $0 \le i \le \phi(n)-1$, $\phi(x)$: Euler function) that is an affine representation of the member g of the n-th degree algebraic torus $T_n(F_{p^m})$ (n: positive integer, p: prime number, m: positive integer) into a set of n elements $(h'_0, h'_1, \ldots, h'_{n-1})$ ($h'_i$: a member of the finite field $F_{p^m}$, $0 \le i \le n-1$) in which at least one element of the n elements is a zero element 0 or an identity element 1. The arithmetic unit 52 performs arithmetic operation omitting part of $F_{p^m}$ operation based on the fact that an element of the set of n elements $(h'_0, h'_1, h'_{n-1})$ is a zero element 0 or an identity element 1 using the limited projective representation h' resulting from the conversion by the representation converting unit 51 in performing the operation by combination of $F_{p^m}$ operation.

Figure 8:
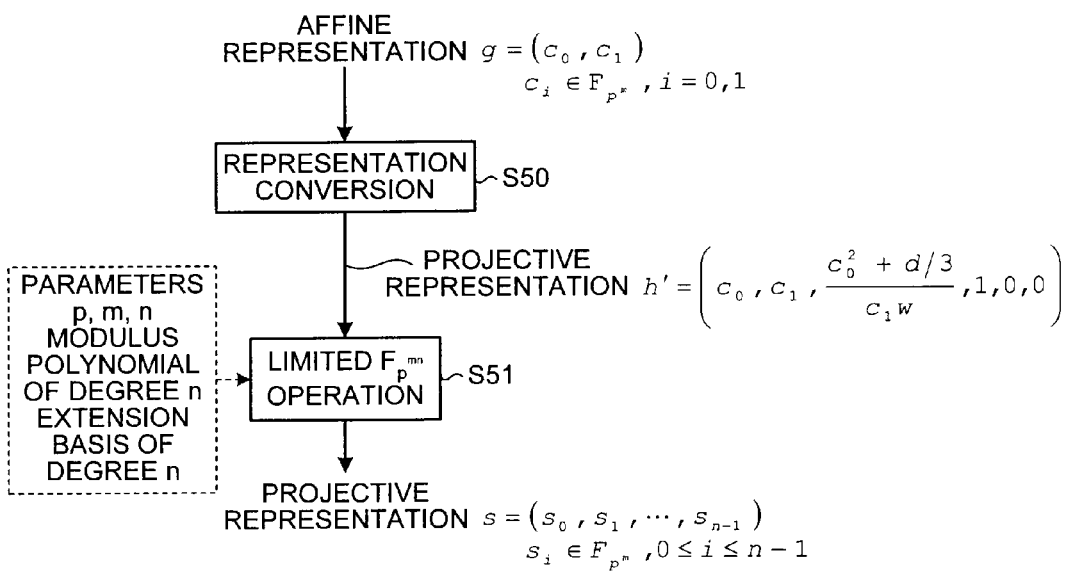
FIG. 8 is a flowchart illustrating procedures of arithmetic processing according to a sixth embodiment.

Next, procedures of arithmetic processing performed by the arithmetic device 50 according to this embodiment will be described. FIG. 8 is a flowchart illustrating the procedures of arithmetic processing according to this embodiment. In step S50, the representation converting unit 51 converts the affine representation expressing the member g of the algebraic torus $T_n(F_{p^m})$ into the limited projective representation h' by the equation 15. In step S51, the arithmetic unit 52 performs arithmetic operation omitting part of the $F_{p^m}$ operation based on the fact that an element in the set of n elements $(h'_0, h'_1, h'_{n-1})$ is the zero element 0 or the identity element 1 by using part of the elements of the limited projective representation h' resulting from the conversion in step S50 or all the elements including the members of the subfield $F_{p^m}$.

As described above, the calculation cost of the arithmetic operation of an algebraic torus can be reduced by converting an input affine representation into a limited projective representation with lower calculation cost as compared to the conventional projective representation. In particular, when the conversion from the projective representation to the limited projective representation is performed as precomputation before performing arithmetic operation that is main computation, the calculation cost of the main computation can be reduced as will be described in the embodiments below. Accordingly, public key encryption, key sharing and digital signature that are implemented by using the arithmetic device of a member of an algebraic torus can be performed at higher speed.

[Seventh Embodiment]

Next, a seventh embodiment of an arithmetic device will be described. Parts that are the same as those in the first embodiment to the sixth embodiment described above will be described using the same reference numerals or description thereof will not be repeated.

In this embodiment, a case in which n=2*r where r=3 is satisfied and a modulus polynomial of cubic extension is $f_3(y)=y^3-w$ in the algebraic torus described in the sixth embodiment above will be described. In addition, an example in which multiplication is used as the arithmetic operation will be described. The functional configuration of an arithmetic device 50 according to this embodiment is substantially the same as that illustrated in FIG. 1. Members of an algebraic torus $T_n(F_{p^m})$ input to the representation converting unit 51 are represented by g1 and g2, and affine representations corresponding to the members g1 and g2 are represented by $(c_0, c_1)$ and $(d_0, d_1)$. The projective representations h1 and h2 each have n elements. The representation converting unit 51 converts such affine representations $(c_0, c_1)$ and $(d_0, d_1)$ into projective representations, at least one of which is a limited projective representation h1' or h2' with lower calculation cost of arithmetic operation. An example in which both of the two affine representations $(c_0, c_1)$ and $(d_0, d_1)$ are converted into the limited projective representations h1' and h2', respectively, will be described herein. Specifically, the representation converting unit 51 converts the projective representation h1 into the limited projective representation h1' of a set of n elements in which at least (r−1) elements out of the n elements are zero elements 0 and at least one element out of the n elements is an identity element 1, and converts the projective representation h2 into the limited projective representation h2' of a set of n elements in which at least (r−1) elements out of the n elements are zero elements 0 and at least one element out of the n elements is an identity element 1. The arithmetic unit 52 performs multiplication (referred to as limited $F_{p^{mn}}$ multiplication) omitting part of the $F_{p^m}$ operation based on the fact that at least (r−1) elements out of the n elements are zero elements 0 and at least one element out of the n elements is an identity element 1 using the limited projective representations h1' and h2' as the multiplication of the members g1 and g2.

The arithmetic operation using multiplication as an example will be described here by comparison with a conventional technology. In the conventional technology, multiplication of the members g1 and g2 is performed by performing representation conversion by the equation 14 and by the equations 18 and 19 using the projective representations of the equations 16 and 17, and the multiplication result $(\alpha 3, \beta 3)$ is obtained. A major part of the calculation cost of multiplication of an algebraic torus is 10M+3B, and a major part of the calculation cost of representation conversion is 2M+4S+2B. Note that part of the result of t1 is reused for calculation of t3 in the equation $$\text{input } (c_0, c_1), (d_0, d_1), \text{output } (\alpha 3, \beta 3) \quad \text{Equation 16}$$

$$(\alpha 1, b1) := \left( c_0 \cdot c_1, c_1^2, \frac{c_0^2 + d/3}{w}, c_1, 0, 0 \right);$$

$$(\alpha 2, b2) := \left( d_0 \cdot d_1, d_1^2, \frac{d_0^2 + d/3}{w}, d_1, 0, 0 \right); \quad \text{Equation 17}$$

$$t1 := \alpha 1 \cdot \alpha 2; t2 := b1 \cdot b2; t3 := (\alpha 1 + b1) \cdot (\alpha 2 + b2);$$

$$\alpha 3 := t1 + d \cdot t2; \quad \text{Equation 18}$$

$$\beta 3 := t3 - t1 - t2; \quad \text{Equation 19}$$

Figure 9:
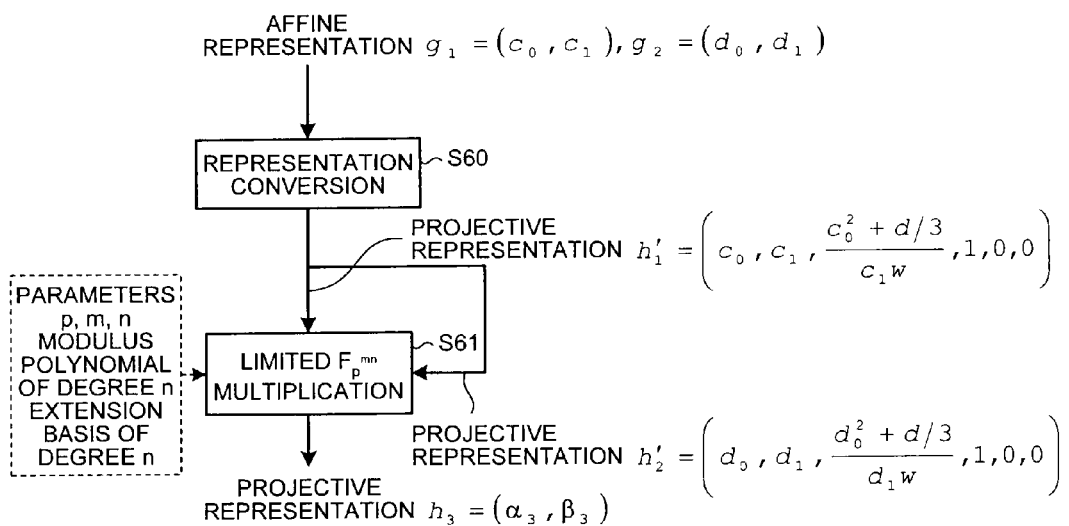
FIG. 9 is a flowchart illustrating procedures of arithmetic processing according to a seventh embodiment.

FIG. 9 is a flowchart illustrating procedures of arithmetic processing according to this embodiment. In this embodiment, the representation converting unit 51 converts the input affine representations $(c_0, c_1)$ and $(d_0, d_1)$ into limited projective representations h1' and h2' by equations 20A and 20B, respectively, in step S60. The limited projective representation h1' is represented by $(\alpha 1', 1)$, and the limited projective representation h2' is represented by $(\alpha 2', 1)$. In step S61, the arithmetic unit 52 performs multiplication of the members g1 and g2 by equations 21 and 22 using the limited projective representations h1' and h2' resulting from the conversion in step S60, and obtains the multiplication result (α3, β3).

A major part of the calculation cost of such multiplication of an algebraic torus is 6M+2B, which is reduced as compared to 10M+3B that is the conventional calculation cost described above. A major part of the calculation cost of representation conversion is 2I+2M+2S+2B, which is increased as compared to 2M+4S+2B. When multiplication of algebraic torus is divided into precomputation and main computation, that is, when the representation conversion is performed as precomputation and the multiplication is performed as the main computation, the total calculation cost including the precomputation and the main computation increases while the calculation cost of the main computation is reduced to about 60% as compared to a case where the representation conversion is not performed.

$$\text{input: } (c_0, c_1), (d_0, d_1), \text{ output: } (\alpha 3, \beta 3) \quad \text{Equation 20A}$$

$$(\alpha 1', 1) := \left( c_0, c_1, \frac{c_0^2 + d/3}{c_1 \cdot w}, 1, 0, 0 \right);$$

$$(\alpha 2', 1) := \left( d_0, d_1, \frac{d_0^2 + d/3}{d_1 \cdot w}, 1, 0, 0 \right); \quad \text{Equation 20B}$$

$$t1' := \alpha 1' \cdot \alpha 2';$$

$$\alpha 3 := t1' + d; \quad \text{Equation 21}$$

$$\beta 3 := \alpha 1' + \alpha 2'; \quad \text{Equation 22}$$

Note that the representation converting unit 51 is configured to convert both of the affine representations $(c_0, c_1)$ and $(d_0, d_1)$ into the limited projective representations h1' and h2' according to this embodiment by the equations 20A and 20B in the example described above. However, even when the representation converting unit 51 converts only either one of the affine representations into a limited projective representation and converts the other affine representation into a projective representation similar to that of the conventional technology, the arithmetic unit 52 can perform arithmetic operation omitting part of the operation as multiplication of g1 and g2 by using the limited projective representation resulting from the conversion by the representative converting unit 51 and the projective representation. Moreover, although both of the projective representations h1 and h2 are converted by the same conversion equation, these projective representations may alternatively be converted into limited projective representations by different conversion equations. Note that while a first element and a second element are used to express a third element of the projective representation in the equation 15, the roles of the second element and the third element may be replaced with each other.

[Eighth Embodiment]

Next, an eighth embodiment of an arithmetic device will be described. Parts that are the same as those in the first embodiment to the seventh embodiment described above will be described using the same reference numerals or description thereof will not be repeated.

In this embodiment, a case in which n=2*r where r=3 is satisfied and a modulus polynomial of cubic extension is $f_3(y)=y^3-w$ in the algebraic torus described in the sixth embodiment above will be described. In addition, an example in which multiplication is used as the arithmetic operation will be described. The functional configuration of an arithmetic device 50 according to this embodiment is substantially the same as that illustrated in FIG. 1. Members of an algebraic torus $T_n(F_{p^\cdot m})$ input to the representation converting unit 51 are represented by g1 and g2, and affine representations corresponding to the members g1 and g2 are represented by $(c_0, c_1)$ and $(d_0, d_1)$. The representation converting unit 51 converts such affine representations $(c_0, c_1)$ and $(d_0, d_1)$ into projective representations, at least one of which is a limited projective representation h1' or h2' with lower calculation cost of arithmetic operation. An example in which both of the two affine representations $(c_0, c_1)$ and $(d_0, d_1)$ are converted into the limited projective representations h1' and h2', respectively, will be described herein. Specifically, the representation converting unit 51 converts the projective representation h1 into the limited projective representation h1' of a set of n elements in which at least (r−1) elements out of the n elements are zero elements 0 and at least one element out of the n elements is an identity element 1, and converts the projective representation h2 into the limited projective representation h2' of a set of n elements in which at least (r−1) elements out of the n elements are zero elements 0 and at least one element out of the n elements is an identity element 1. The arithmetic unit 52 performs multiplication (referred to as limited $F_{p^\cdot mn}$ multiplication) omitting part of the $F_{p^\cdot m}$ operation based on the fact that at least (r−1) elements out of the n elements are zero elements 0 and at least one element out of the n elements is an identity element 1 using the limited projective representations h1' and h2' as the multiplication of the members g1 and g2. The Toom-Cook method is used for the multiplication of the members g1 and g2.

In the conventional technology, a major part of the calculation cost of the multiplication of the algebraic torus using the representation conversion of FIG. 7 is 8M+3B, and a major part of the calculation cost of the representation conversion is 2M+4S+2B.

Figure 10:
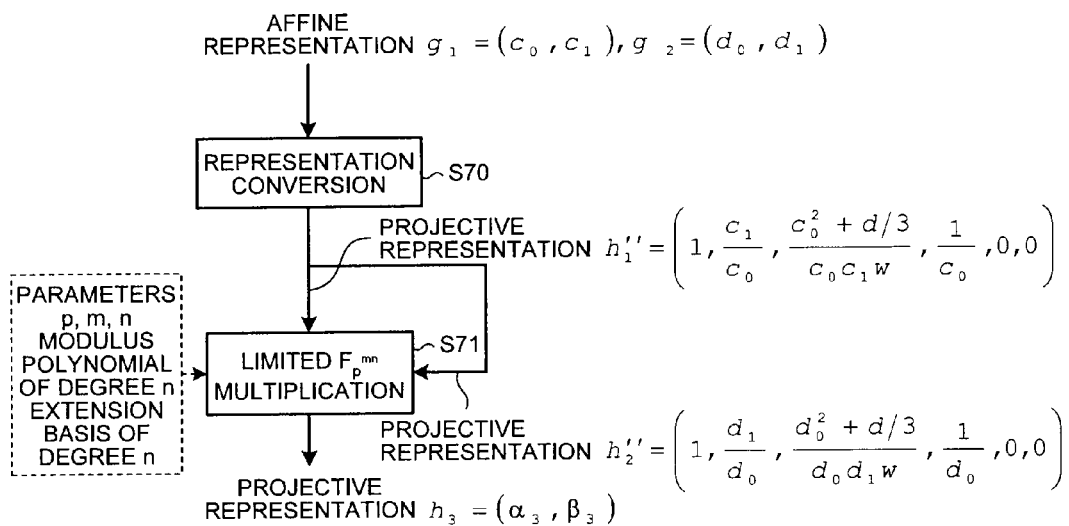
FIG. 10 is a flowchart illustrating procedures of arithmetic processing according to an eighth embodiment.

FIG. 10 is a flowchart illustrating procedures of arithmetic processing according to this embodiment. In this embodiment, the representation converting unit 51 converts the input affine representations $(c_0, c_1)$ and $(d_0, d_i)$ into limited projective representations h1' and h2' by equations 20A and 20B, respectively, in step S60. The difference thereof from the equation 15 is that the entire projective representation of the equation 15 is multiplied by an inverse of $c_0$ so that the constant becomes 1. Alternatively, the projective representation may be multiplied by $d^{\wedge}(-1) \times x$ so that the constant becomes 1. In step S71, the arithmetic unit 52 performs arithmetic operation limited to members of the subfield $F_{p^\cdot m}$, by using the limited projective representations h1' and h2' resulting from the conversion in step S70 as the multiplication of the members g1 and g2.

$$(c_0, c_1) := 1 + \frac{c_1^2}{c_0 \cdot c_1} y + \frac{c_0^2 + d/3}{c_0 \cdot c_1 \cdot w} y^2 + \frac{c_1}{c_0 \cdot c_1} x \quad \text{Equation 23}$$

A major part of the calculation cost of the multiplication of the algebraic torus using such limited projective representations h1' and h2' is 5M+3B, and a major part of the calculation cost of the representation conversion is 2I+8M+4S+2B. A basis in the Toom-Cook method is not converted to a quadratic extension of a cubic extension but is converted to an extension of degree six. For example, a basis of a polynomial of x and y or a basis of a pseudo-polynomial is converted by replacing the polynomial basis or the pseudo-polynomial basis with elements and multiplying the polynomial basis or the pseudo-polynomial basis by a constant. When multiplication of algebraic torus is divided into precomputation and main computation, that is, when the representation conversion is performed as precomputation and the multiplication is performed as the main computation, the total calculation cost including the precomputation and the main computation increases while the calculation cost of the main computation is reduced to about 63% as compared to a case where the representation conversion is not performed.

Note that although the calculation cost is that of a case where the representation converting unit 51 converts both of the affine representations $(c_0, c_1)$ and $(d_0, d_1)$ into limited projective representations h1' and h2' by the equation 23, even when converting either one of the affine representations into a limited projective representation and converting the other into a projective representation similar to that of the conventional technology, the arithmetic unit 52 can perform the arithmetic operation omitting part of the $F_{p^m}$ operation as the multiplication of the members g1 and g2 by using the limited projective representation resulting from the conversion by the representation converting unit 51 and the projective representation. Moreover, although both of the projective representations h1 and h2 are converted by the same conversion equation, these projective representations may alternatively be converted into limited projective representations by different conversion equations. Note that while a first element and a second element are used to express a third element of the projective representation in the equation 23, the roles of the second element and the third element may be replaced with each other. In addition, the basis of the extension field of degree six may be another polynomial basis or pseudo-polynomial basis that satisfies s=xy.

[Ninth Embodiment]

Next, a ninth embodiment of an arithmetic device will be described. Parts that are the same as those in the first embodiment to the eighth embodiment described above will be described using the same reference numerals or description thereof will not be repeated.

In this embodiment, a case in which n=2*r where r=3 is satisfied and a modulus polynomial of cubic extension is $f_3(y)=y^3-w$ in the algebraic torus described in the sixth embodiment above will be described. In addition, an example in which Frobenius mapping $\phi^u: x \to x^{(p^u)}$ is used as the arithmetic operation will be described. The functional configuration of an arithmetic device 50 according to this embodiment is substantially the same as that illustrated in FIG. 1. A member of an algebraic torus $T_n(F_{p^m})$ input to the representation converting unit 51 is represented by g1, affine representation corresponding to the member g1 is represented by $(c_0, c_1)$, and u is a positive integer. The representation converting unit 51 converts the affine representation $(c_0, c_1)$ representing the member g1 into the limited projective representation h1' of a set of n elements in which at least (r−1) elements out of the n elements are zero elements 0 and at least one element out of the n elements is an identity element 1 by the equation 15. The arithmetic unit 52 performs Frobenius mapping (limited Frobenius mapping) omitting part of the $F_{p^m}$ operation by using the limited projective representation h1' as the Frobenius map of the member g1.

The arithmetic operation using Frobenius mapping as an example will be described here by comparison with a conventional technology. In the conventional technology, Frobenius mapping $\phi^u(g1)$ of the member g1 is performed by performing representation conversion by the equation 14 and by the equations 25 and 26 using the projective representations of the equation 24, and the mapping result $(\alpha 3, \beta 3)$ is obtained. A major part of the calculation cost of such Frobenius mapping of an algebraic torus is 4F+3B, and a major part of the calculation cost of the representation conversion is M+2S+B.

$$\text{input } (c_0, c_1), l, \text{ output: } (\alpha 3, \beta 3) \quad \text{Equation 24}$$

$$(\alpha 1, b1) := \left( c_0 \cdot c_1, c_1^2, \frac{c_0^2 + d/3}{w}, c_1, 0, 0 \right);$$

$$t1 := \alpha 1^{p'}; t2 := b1^{p'};$$

$$\alpha 3 := t1; \quad \text{Equation 25}$$

$$\beta 3 := t2 \cdot d^{(p'-1)/2}; \quad \text{Equation 26}$$

Figure 11:
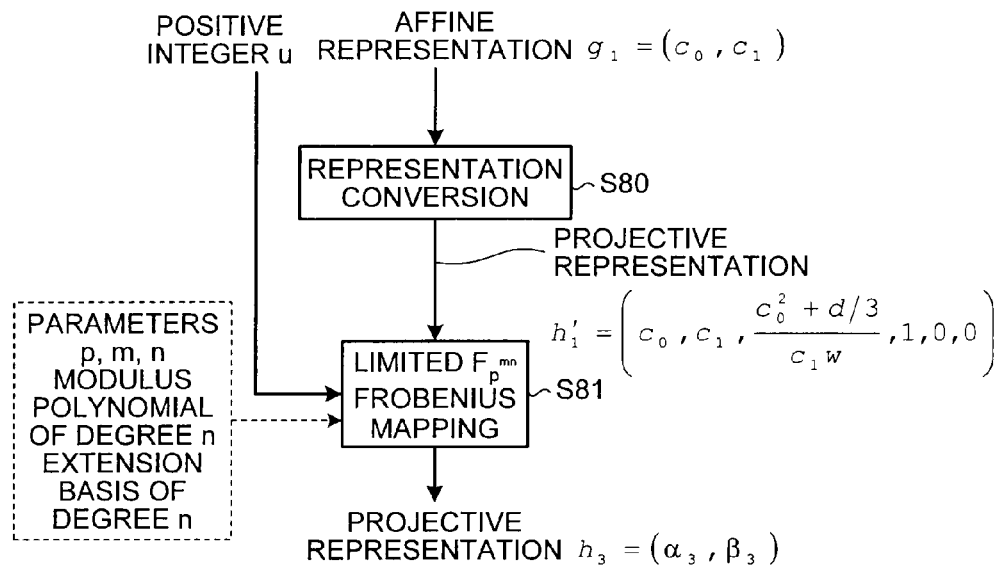
FIG. 11 is a flowchart illustrating procedures of arithmetic processing according to a ninth embodiment.

FIG. 11 is a flowchart illustrating procedures of arithmetic processing according to this embodiment. In this embodiment, the representation converting unit 51 converts the affine representation $(c_0, c_1)$ representing the member g1 into the limited projective representation h1' by the equation 15 in step S80. In step S81, the arithmetic unit 52 performs the limited Frobenius mapping by equations 28 and 29 using the limited projective representation h1' expressed by an equation 27, and obtains the mapping result $(\alpha 3, \beta 3)$.

A major part of the calculation cost of such Frobenius mapping of an algebraic torus is 3F+2B, which is reduced as compared to 4F+3B that is the conventional calculation cost described above. A major part of the calculation cost of the representation conversion is I+M+S+B, which is increased as compared to M+2S+B that is the conventional calculation cost of the representation conversion. When Frobenius mapping of algebraic torus is divided into precomputation and main computation, that is, when the representation conversion is performed as precomputation and calculation of a Frobenius map is performed as the main computation, the total calculation cost including the precomputation and the main computation increases while the calculation cost of the main computation is reduced as compared to a case where the representation conversion is not performed.

$$\text{input } (c_0, c_1), l, \text{ output: } (\alpha 3, \beta 3) \quad \text{Equation 27}$$

$$(\alpha 1', 1) := \left( c_0, c_1, \frac{c_0^2 + d/3}{c_1 \cdot w}, 1, 0, 0 \right);$$

$$t1' := \alpha 1'^{p'};$$

$$\alpha 3 := t1'; \quad \text{Equation 28}$$

$$\beta 3 := d^{(p'-1)/2}; \quad \text{Equation 29}$$

Note that although the calculation cost is that of a case where the representation converting unit 51 converts the affine representation $(c_0, c_1)$ representing the member g1 into the limited projective representation by the equation 15, even when converting the affine representation into the limited projective representation by another equation such as the equation 23, the arithmetic unit 52 can perform the arithmetic operation omitting part of the $F_{p^m}$ operation as the multiplication of the members g1 and g2 by using the limited projective representation resulting from the conversion by the representation converting unit 51. In addition, the roles of a second element and a third element may be replaced with each other in the equations 15 and 23.

[Tenth Embodiment]

Next, a tenth embodiment of an arithmetic device will be described. Parts that are the same as those in the first embodiment to the ninth embodiment described above will be described using the same reference numerals or description thereof will not be repeated.

Figure 12:
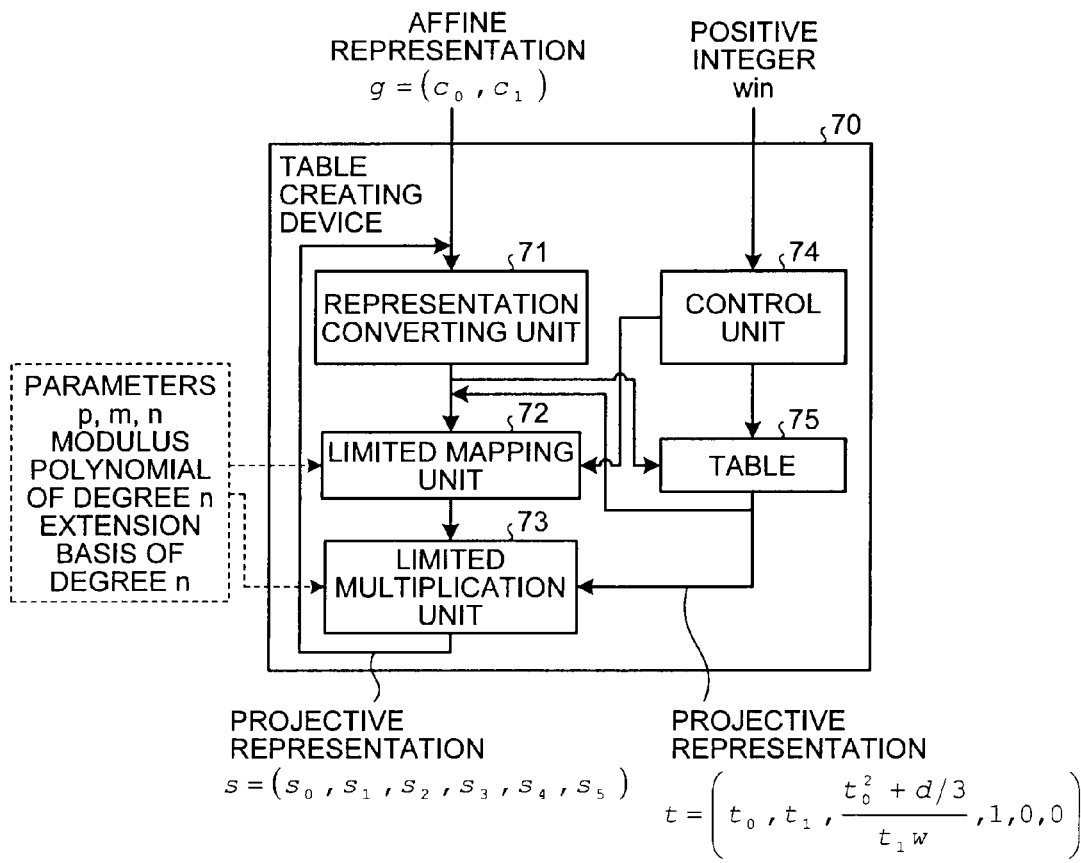
FIG. 12 is a diagram illustrating a functional configuration of a table creating device according to a tenth embodiment.
Figure 13:
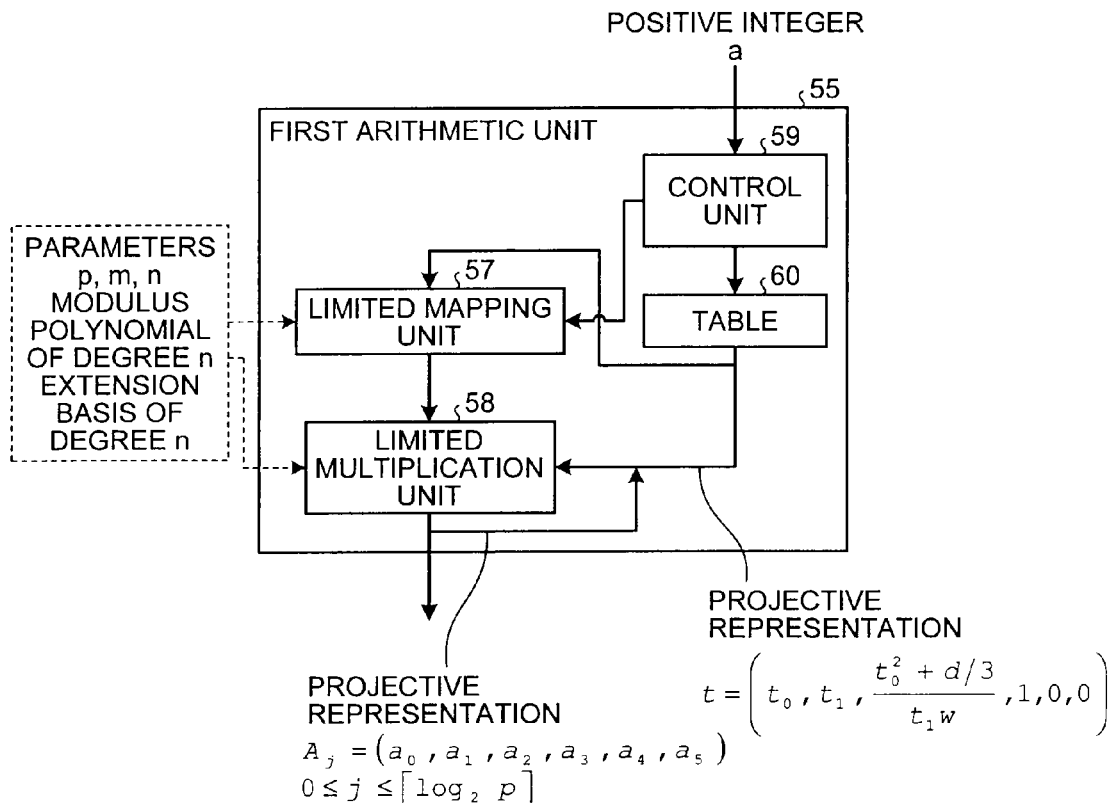
FIG. 13 is a diagram illustrating a functional configuration of an arithmetic device according to the tenth embodiment.

In this embodiment, a case in which n=2*r where r=3 is satisfied and a modulus polynomial of cubic extension is $f_3(y)=y^3-w$ in the algebraic torus described in the sixth embodiment above will be described. In addition, an example in which exponentiation is used as the arithmetic operation will be described. FIG. 12 is a diagram illustrating a functional configuration of a table creating device 70 according to this embodiment. The hardware configuration of the table creating device 70 is substantially the same as that of an arithmetic device 50. FIG. 13 is a diagram illustrating a functional configuration of the arithmetic device 50 according to this embodiment. The table creating device 70 includes a representation converting unit 71, a limited mapping unit 72, a limited multiplication unit 73, a control unit 74 and a table 75. The arithmetic device 50 includes a first arithmetic unit 55 and a second arithmetic unit 56. The first arithmetic unit 55 includes a limited mapping unit 57, a limited multiplication unit 58, a control unit 59 and a table 60. The second arithmetic unit 56 includes a squaring unit 61 and a multiplication unit 62. With such a configuration, the table creating device 70 creates a table 75, and the arithmetic device 50 calculates exponentiation using the table 75 in this embodiment. The calculation of exponentiation is performed combining multiplication, squaring and Frobenius mapping (see, for example, "Evaluation of Exponentiation on Algebraic Tori"). Such calculation of exponentiation is performed by using the Karatsuba's method. Note that although the table creating device 70 and the arithmetic device 50 are provided separately, these may be integrated.

A member of an algebraic torus $T_n(F_{p^m})$ input to the representation converting unit 71 of the table creating device 70 is represented by g1, and an affine representation corresponding to the member g1 is represented by $(c_0, c_1)$. win is a positive integer, and a is a positive integer. The representation converting unit 71 converts the input affine representation $(c_0, c_1)$ into a projective representation h1' with lower calculation cost of arithmetic operation. The positive integer win is input to the control unit 74, and the control unit 74 stores an entry into the table 75 by using the positive integer win and the projective representation h1' resulting from the conversion by the representation converting unit 71. The limited mapping unit 72 refers to the entry stored in the table 75 and performs limited $F_{p^{mn}}$ Frobenius mapping. The limited multiplication unit 73 performs limited $F_{p^{mn}}$ multiplication by using the result of the limited $F_{p^{mn}}$ Frobenius mapping performed by the limited mapping unit 72 and the entry stored in the table 75.

The table 60 of the first arithmetic unit 55 is similar to the table 75 created by the table creating device 70. The positive integer a is input to the control unit 59, and the control unit 59 refers to entries stored in the table 60, and selects an entry to be used by the limited mapping unit 57 in performing the limited $F_{p^{mn}}$ Frobenius mapping. The limited mapping unit 57 performs the limited $F_{p^{mn}}$ Frobenius mapping by using the entry selected by the control unit 59. The limited multiplication unit 58 performs limited $F_{p^{mn}}$ multiplication by using the result of the limited $F_{p^{mn}}$ Frobenius mapping performed by the limited mapping unit 57 and the entry stored in the table 60. A projective representation resulting therefrom is input to the squaring unit 61 of the second arithmetic unit 56.

The squaring unit 61 performs calculates squaring using the input projective representation. The multiplication unit 62 performs multiplication by using the result of calculation performed by the squaring unit 61. A projective representation resulting therefrom is the calculation result of exponentiation.

The arithmetic operation for calculating the exponentiation g^a will be described here by comparison with a conventional technology. An exponent a is input in a p-adic representation or a p-adic expansion is calculated to obtain a p-adic representation. Next, a binary representation of each digit of the exponent a represented in the p-adic representation is obtained. Sequences including the same digits of the binary representation are obtained for each digit of the p-adic representation of the exponent a. All sequences starting from 1 and ending with 1 within a window width win are extracted as entries of the table from the obtained ceil($\log_2(p)$) sequences having a length of 2 m. Alternatively, all possible sequences within the window width win are calculated in advance as entries of the table. The table creating unit calculates $T_{11}=g \times \phi(g)$ for a third sequence 11 and $T_{1101}=g \times \phi^1(g) \times \phi^3(g)$ for an eleventh sequence 1101, for example, and stores the calculation results in the table. Note that the representations of sequences require attention because the sequences are represented in such a manner opposite to a normal manner that the beginning corresponds to $p^0$ and subsequently $p^1, p^2, \ldots$ Thus, $T_{B0\,B1\,B2\,B3\,\ldots\,Bi\,\ldots\,Bwin-1}=\Pi_i \phi^{(B_i*i)}(g)$ is calculated for a k-th sequence B0 B1 B2 B3 ... Bi ... $B_{win-1}$ and held. Note that $B_{win-1}$ means that an index of B is win−1.

In this calculation, sequences of a 2^j-th digit in a binary representation of each digit of the exponent a are represented by combinations of entries in the table. Here, j is a non-negative integer. For example, a sequence 11001101 is represented as 11.00.1101. The respective digits of the sequence correspond to the respective digits of the p-adic. The first arithmetic unit calculates $T_{11} \times \phi^4(T_{1101})$ for 11.00.1101, for example. The result of calculation corresponding to a sequence of the 2^j-th digit is $A_j$. The second arithmetic unit repeats calculating a square of $A_j$ from the largest j, multiplying $A_j^2$ and the next and calculating a square of the multiplication result, and multiplying $(A_j^2 * A_{j-1})^2$ and the next $A_{j-2}$ and calculating a square of the multiplication result. $0 \le j \le \text{ceil}(\log_2(p))-1$ where ceil (x) is a ceiling function that returns a smallest integer equal to or larger than x is satisfied.

With respect to the calculation cost, a major part of the maximum value of the calculation cost for generating the table includes:

[T1] (win−1) multiplications of an input member g and a Frobenius map of the member g in an algebraic torus; and

[T2] (2^(win−1)-win) multiplications of an input member g and a Frobenius map of an entry already existing in the table in an algebraic torus.

A major part of the calculation cost of the main computation is determined by an exponent a, a window width win and an extension degree m of a base field. The breakdown of f(a, win, m) multiplications in an algebraic torus includes:

[M1] ceil($\log_2(p)$) multiplications in an algebraic torus of entries in the table;

[M2] (f(a, win, m)−2ceil($\log_2(p)$)+1) multiplications in an algebraic torus of an intermediate result and an entry in the table;

[M3] the number of times of multiplication corresponding to an operation of multiplying Aj;

[M4] (ceil($\log_2(p)$)−1) squarings of an intermediate result in an algebraic torus.

With the conventional technology, an input affine representation is converted into a projective representation by the equation 14, creation of a table is then performed and an obtained multiplication result is held in the table without any change. Calculation cost in a case where calculation of exponentiation is performed by using the Karatsuba's method in the conventional technology will be described.

[T0] The calculation cost of representation conversion of an input member g is M+2S+B;

[T1] the calculation cost of multiplication of an input member g and a Frobenius map of the member g in an algebraic torus is 10M+3B per one calculation similarly to the conventional technology described in the eighth embodiment since the calculation is multiplication of projective representations in which two elements out of six members of $F_{p^m}$ are 0 in an algebraic torus; and

[T2] the calculation cost of an input member g and an entry already existing in the table in an algebraic torus is 15M+7B per one calculation since the calculation is multiplication of a projective representation in which two elements out of six members of $F_{p^m}$ are 0 and a typical projective representation in an algebraic torus.

Entries in the table are typical representations except $T_1$. For simple description, the calculation cost is estimated assuming that all entries are typical projective representations.

[M1] to [M3] the calculation cost is 18M+9B per one calculation since the calculation is multiplication of typical projective representations in an algebraic torus; and

[M4] the calculation cost is 12M+10B per one calculation when the Complex method (to be described later) is used since the calculation is an algebraic torus squaring of typical projective representations.

When the calculation cost of exponentiation in an algebraic torus with the conventional technology is calculated based on the above all together, the calculation cost of table creation is obtained by an equation 30 and the calculation cost of the main computation is obtained by an equation 31.

$$(15 \cdot 2^{win-1} - 5 \cdot win - 9)M + 2S + (7 \cdot 2^{win-1} - 4 \cdot win - 2)B \quad \text{Equation 30}$$

$$(18f(a,win,m) + 12ceil(log_2 p) - 12)M + (9f(a,win,m) + 10ceil(log_2 p) - 10)B \quad \text{Equation 31}$$

Figure 14:
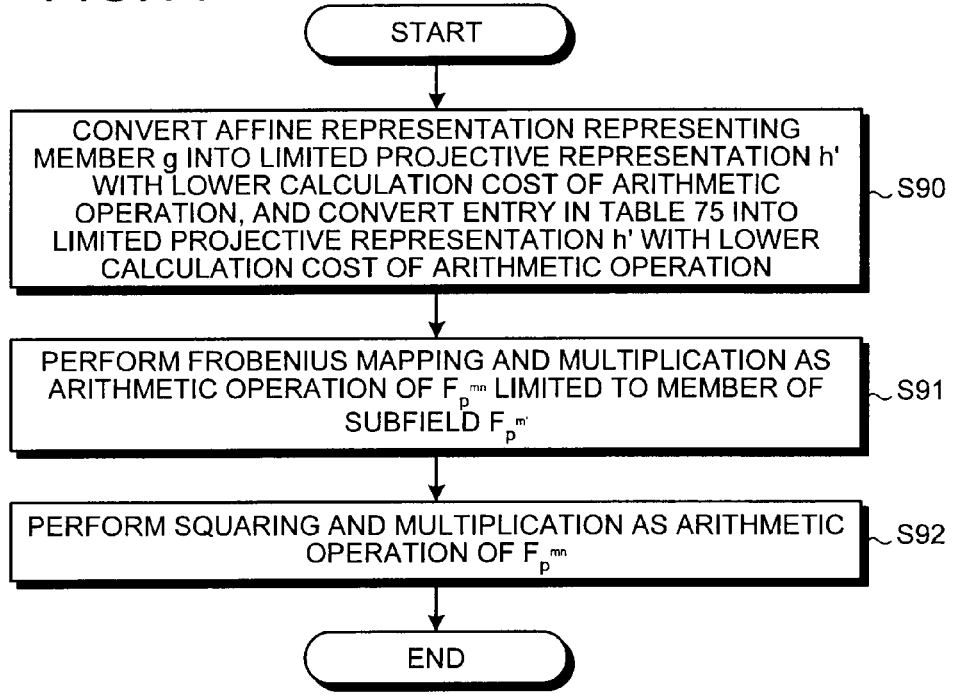
FIG. 14 is a flowchart illustrating procedures of arithmetic processing according to the tenth embodiment.

Next, procedures of arithmetic processing according to this embodiment will be described. FIG. 14 is a flowchart illustrating the procedures of arithmetic processing according to this embodiment. In step S90, the representation converting unit 71 of the table creating device 70 converts an affine representation representing a member g into a limited projective representation by the equation 15, and also converts an entry in the table 75 into a limited projective representation according to the seventh to ninth embodiments. Then, the control unit 74 creates the table 75 by storing the entry in the table 75. Entries in such a table 75 are stored in the table 60 of the arithmetic device 50. In step S91, the first arithmetic unit 55 performs the limited $F_{p^{mn}}$ Frobenius mapping and the limited $F_{p^{mn}}$ multiplication by using the limited projective representations resulting from the conversion in step S90. In step S92, the second arithmetic unit 56 performs squaring and multiplication by using the limited projective representation obtained as a result of the arithmetic operation in step S91.

Next, an example of the calculation cost in a case where the calculation of squaring is performed by using the Karatsuba's method in this embodiment will be described.

[T0] The calculation cost of representation conversion of an input member g is I+M+S+B;

[T1] to [T2] the calculation cost of multiplication in an algebraic torus is 6M+2B per one calculation similarly to the eighth embodiment; and

[T3] the calculation cost of representation conversion of an entry in the table 75 is I+24M with maximum number of times of (2^(win-1)-1), one inversion of $F_{p^{mr}}$ and one $F_{p^{mr}}$ multiplication per one calculation and using the Itoh-Tsujii method (to be described later) for the inverse calculation. The entries in the table 75 are all projective representation in which two elements are 0 and one element is 1 out of six members of $F_{p^m}$.

[M1] The calculation cost of the multiplication of entries in the table 60 in an algebraic torus is 6M+2B per one calculation similarly to the eighth embodiment;

[M2] the calculation cost of the multiplication of an intermediate result and an entry in the table 60 in an algebraic torus is 12M+7B per one calculation since the calculation is multiplication of a typical projective representation and a projective representation in which two elements are 0 and one element is 1 out of six members of in an algebraic torus;

[M3] the calculation cost of the multiplication of intermediate results in an algebraic torus is 18M+9B per one calculation since the calculation is multiplication of typical projective representations; and

[M4] the calculation cost of the squaring is 12M+10B per one calculation since the calculation is squaring of typical projective representations in an algebraic torus when the Complex method is used. When the calculation cost of exponentiation in an algebraic torus according to this embodiment is calculated based on the above all together, the calculation cost for creating the table 75 is obtained by an equation 32 and the calculation cost of the main computation is obtained by an equation 33.

$$2^{win-1}I + (30 \cdot 2^{win-1} - 29)M + 2S + (2 \cdot 2^{win-1} - 1)B \quad \text{Equation 32}$$

$$(12f(a,win,m) + 12ceil(log_2 p) - 18)M + (7f(a,win,m) + 7ceil(log_2 p) - 12)B \quad \text{Equation 33}$$

As a result of comparing the calculation cost in the conventional technology using the Karatsuba's method and the calculation cost according to this embodiment, an increase in the calculation cost for creating the table 75 can be obtained by an equation 34 and a decrease in the calculation cost for the main computation can be obtained by an equation 35.

$$2^{win-1}I + (15 \cdot 2^{win-1} + 5 \cdot win - 20)M - S + (-5 \cdot 2^{win-1} + 4 \cdot win + 1)B \quad \text{Equation 34}$$

$$(6f(a,win,m) + 6)M + (2f(a,win,m) + 3ceil(log_2 p) + 2)B \quad \text{Equation 35}$$

As specific numerical values, when $ceil(log_2 (p)) = 13$, a is about 700 bits, win=5 and m=27, f(a, win, m)=118.72 is obtained in average (see, for example, "Evaluation of Exponentiation on Algebraic Tori"). In this case, the increase in the calculation cost for creating the table 75 is 16I-245M-S-59B, and the decrease in the calculation cost for the main computation is 718.32M+278.443. If the creation of the table 75 is performed as precomputation and the calculation of exponentiation is performed as main computation in the exponentiation in an algebraic torus, the total calculation cost is increased by {(16I+245M-S-59B)-(718.32M+278.44B)} as compared to a case where the representation conversion is not performed. Since I<30M+21B is normally satisfied, the total calculation cost decreases, and at the same time, the calculation cost of the main computation also decreases to about two thirds.

Note that although the calculation cost described above is that of a case where the affine representation representing the member g and the affine representation representing the entry $T_i$ in the table 75 are all converted into limited projective representations by the equation 15, these may be converted into limited projective representations by different representation conversion. For example, representation conversion may be performed by the equation 23, or representation conversion may be performed by replacing the roles of the second elements and the third elements with each other in the equation 15 and the equation 23. Alternatively, an intermediate value $A_j$ may further be subjected to representation conversion. Alternatively, the first arithmetic unit 55 may perform the calculation of the second arithmetic unit 56 without holding the intermediate value $A_j$. Thus, the first arithmetic unit 55 may be configured to calculate j of the second arithmetic unit 56 in the reverse order.

[Eleventh Embodiment]

Next, an eleventh embodiment of an arithmetic device will be described. Parts that are the same as those in the first embodiment to the tenth embodiment described above will be described using the same reference numerals or description thereof will not be repeated.

Figure 15:
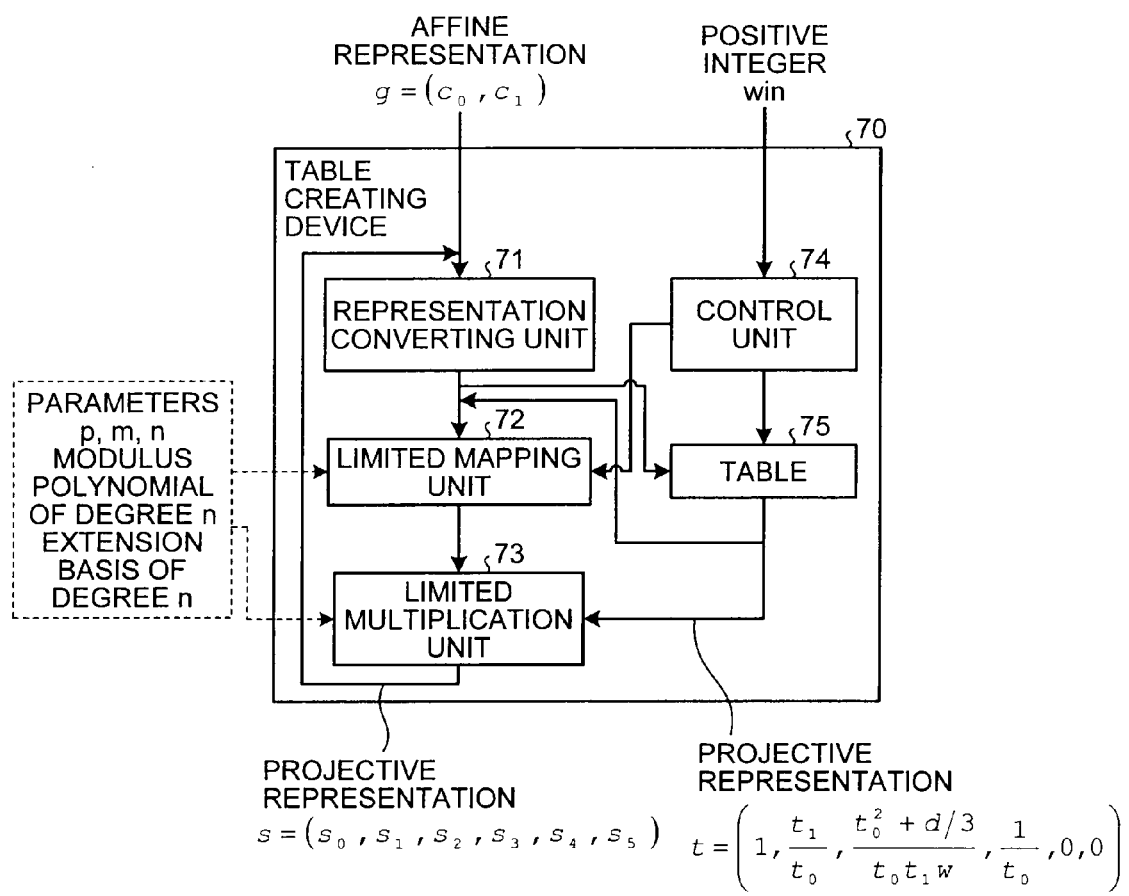
FIG. 15 is a diagram illustrating a functional configuration of a table creating device according to an eleventh embodiment.

In this embodiment, an example in which the calculation of exponentiation in an algebraic torus described in the tenth embodiment above is performed by using the Toom-Cook method will be described. FIG. 15 is a diagram illustrating a functional configuration of a table creating device 70 according to this embodiment. FIG. 16 is a diagram illustrating a functional configuration of an arithmetic device 50 according to this embodiment. The functional configuration of the table creating device 70 according to this embodiment is substantially the same as the functional configuration in the tenth embodiment illustrated in FIG. 12, and the functional configuration of the arithmetic device 50 according to this embodiment is substantially the same as the functional configuration in the tenth embodiment illustrated in FIG. 13, but there are different in that calculation of exponentiation in an algebraic torus is performed by using the Toom-Cook method, which will be described below.

With the conventional technology, an input affine representation is converted into a projective representation by the equation 14, creation of a table is then performed and an obtained multiplication result is held in the table without any change. Calculation cost in a case where calculation of exponentiation is performed by using the Toom-Cook method in the conventional technology will be described.

[T0] M+2S+B;

[T1] the calculation cost of 8M+3B per one calculation similarly to the conventional technology described in the seventh embodiment; and

[T2] the calculation cost of 10M+4B per one calculation since the calculation is multiplication of a projective representation in which two elements out of six members of $F_{p^m}$ is 0 and a typical projective representation in an algebraic torus. Entries in the table are typical representations except $T_1$. For simple description, the calculation cost is estimated assuming that all entries are typical projective representations.

[M1] to [M3] the calculation cost of 11M+5B per one calculation since the calculation is multiplication of typical projective representations in an algebraic torus; and

[M4] the calculation cost of 11S+5B per one calculation since the calculation is squaring of typical projective representations in an algebraic torus. When the calculation cost of exponentiation in an algebraic torus with the conventional technology is calculated based on the above all together, the calculation cost of table creation is obtained by an equation 36 and the calculation cost of the main computation is obtained by an equation 37.

$$(10 \cdot 2^{win-1}-2 \cdot win-7)M+2S+(4 \cdot 2^{win-1}-win-2)B \quad \text{Equation 36}$$

$$11f(a,win,m)M+(11ceil(\log_2 p)-11)S+(5f(a,win,m)+5ceil(\log_2 p)-5)B \quad \text{Equation 37}$$

Next, procedures of arithmetic processing according to this embodiment will be described. A flowchart illustrating the procedures of arithmetic processing according to this embodiment is substantially the same as that illustrated in FIG. 14. In this embodiment, however, the representation converting unit 71 converts an affine representation representing a member g into a limited projective representation by the equation 23 and also converts an entry in the table 75 into a limited projective representation in which one element of an extension of degree six is 1 in step S90. Specifically, it is assumed that $(a_0, a_1, a_2, b_0, 0, 0) = (\alpha \cdot \beta^{\wedge}2m + p^{\wedge}m), N(\beta))$ and second to fourth elements are then multiplied by an inverse of $a_0$, without using $\alpha/\beta$ as in the second to fifth embodiments. Note that $N(\beta)$ is a norm map of $\beta$. Then, the control unit 74 creates the table 75 by storing the entry in the table 75. Entries in such a table 75 are stored in the table 60 of the arithmetic device 50. In step S91, the first arithmetic unit 55 performs the limited $F_{p^{mn}}$ Frobenius mapping and the limited $F_{p^{mn}}$ multiplication by using the limited projective representations resulting from the conversion in step S90. In step S92, the second arithmetic unit 56 performs squaring and multiplication by using the limited projective representation obtained as a result of the arithmetic operation in step S91.

Next, an example of the calculation cost in a case where the calculation of exponentiation is performed by using the Toom-Cook method in this embodiment will be described.

[T0] I+4M+2S+B;

[T1] to [T2] the calculation cost of 5M+3B per one calculation similarly to the eighth embodiment; and

[T3] the calculation cost of I+21M per one calculation with maximum number of times $(2^{\wedge}(win-1)-1)$ of representation conversion of an entry in the table 75.

The entries in the table 75 are all projective representation in which two elements are 0 and one element is 1 out of six members of $F_{p^m}$.

[M1] The calculation cost of 5M+3B per one calculation similarly to the eighth embodiment;

[M2] the calculation cost of 8M+4B per one calculation since the calculation is multiplication of a typical projective representation and a projective representation in which two elements are 0 and one element is 1 out of six members of $F_{p^m}$ in an algebraic torus;

[M3] the calculation cost of 11M+5B since the calculation is of the typical projective representations; and

[M4] the calculation cost of 11S+5B per one calculation since the calculation is squaring of typical projective representations in an algebraic torus. When the calculation cost of exponentiation in an algebraic torus according to this embodiment is calculated based on the above all together, the calculation cost for creating the table 75 is obtained by an equation 38 and the calculation cost of the main computation is obtained by an equation 39.

$$2^{win-1}I+(26 \cdot 2^{win-1}-22)M+2S+(3 \cdot 2^{win-1}-2)B \quad \text{Equation 38}$$

$$(8f(a,win,m)-3)M+(11ceil(\log_2 p)-11)S+(4f(a,win,m)+5ceil(\log_2 p)-6)B \quad \text{Equation 39}$$

As a result of comparing the calculation cost in the conventional technology using the Toom-Cook method and the calculation cost according to this embodiment, an increase in the calculation cost for creating the table 75 can be obtained by an equation 40 and a decrease in the calculation cost for the main computation can be obtained by an equation 41.

$$2^{win-1}I+(16 \cdot 2^{win-1}+2win-15)M+(-2^{win-1}+win)B \quad \text{Equation 40}$$

$$(3f(a,win,m)+3)M+(f(a,win,m)+1)B \quad \text{Equation 41}$$

With the specific example of the parameters in the tenth embodiment, the increase in the calculation cost for creating the table 75 is 16I+251M−11B, and the decrease in the calculation cost for the main computation is 359.16M+119.72B. If the creation of the table 75 is performed as precomputation and the calculation of exponentiation is performed as main computation in the exponentiation in an algebraic torus, the total calculation cost is increased by {(16I+251M−11B)−(359.16M+119.72B)} as compared to a case where the representation conversion is not performed. When I<6.76M+8.17B is satisfied, the total calculation cost decreases, and at the same time, the calculation cost of the main computation also decreases to about 72%.

Note that although the calculation cost described above is that of a case where the affine representation representing the member g and the affine representation representing the entry $T_i$ in the table 75 are all converted into limited projective representations by the equation 23, these may be converted into limited projective representations by different representation conversion. For example, representation conversion may be performed by the equation 15, or representation conversion may be performed by replacing the roles of the second elements and the third elements with each other in the equation 15 and the equation 23. Alternatively, an intermediate value $A_j$ may further be subjected to representation conversion. Alternatively, the first arithmetic unit 55 may perform the calculation of the second arithmetic unit without holding the intermediate value $A_j$, that is, the first arithmetic unit 55 may be configured to calculate j of the second arithmetic unit 56 in the reverse order. In addition, the basis of the extension field of degree six may be another polynomial basis or pseudo-polynomial basis that satisfies s=xy.

Here, outlines of the Karatsuba's method, the Toom-Cook method, the Complex method and the Itoh-Tsujii method that are conventional calculation methods used in the embodiments described above will be each described.

<Karatsuba's Method>

One of calculation methods for multiplication of an extension field. It is assumed that members of an extension field are $(a_0, a_1, \ldots, a_{k-1})$ and $(b_0, b_1, b_{k-1})$ as sets of members of base fields. $k^2$ base field multiplications in total of $a_i \times b_j$, where $0 \le i \le k-1$ and $0 \le j \le k-1$, appear in multiplication of an extension field. This is expressed by using results of calculating $k(k+1)/2$ base field multiplication in total of $a_i \times b_j$ where $0 \le i = j \le k-1$ and $(a_i+a_j) \times (b_i+b_j)$ where $i \ne j$, $0 \le i \le k-1$, and $0 \le j \le k-1$. The base field addition is increased in return to reduction in the base field multiplication to $k(k+1)/2$, but the calculation cost as a whole is decreased.

<Toom-Cook Method>

One of calculation methods for multiplication of an extension field. It is assumed that members of an extension field are $a_0+a_1 x+a_2 x^2+ \ldots +a_{k-1}x^{(k-1)}$ and $b_0+b_1 x+b_2 x^2+ \ldots +b_{k-1}x^{(k-1)}$ as polynomial representations with members of base fields as coefficients. $(2k-1)$ base field multiplications $v(x)=(a_0+a_1 x+a_2 x^2+ \ldots +a_{k-1}x^{(k-1)})(b_0+b_1 x+b_2 x^2+ \ldots +b_{k-1}x^{(k-1)})$ in which values are assigned to x are calculated. For example, $v(0)=a_0 \times b_0$, $v(1)$, $v(-1)$, $v(\infty)=a_{k-1} \times b_{k-1}$ and so on are calculated. The coefficients of the polynomials as a result of multiplication of the extension field are expressed by $v(0), v(1), v(-1)$ and $v(\infty)$ by solving simultaneous equations where $(2k-1)$ values of x=0, 1, −1, and ∞. The base field addition is increased more than in the Karatsuba's method in return to reduction in the base field multiplication to $(2k-1)$.

<Complex Method>

One of calculation methods for squaring of a quadratic extension field. A member of an extension field is represented by $a_0+a_1 x$ as a polynomial representation in which coefficients are members of a base field. It is assumed that a modulus polynomial is $f_2(x)=x^2-d$. Since $(a_0+a_1 x)^2=(a_0^2+d \times a_1^2)+(2 a_0 a_1) x$ is derived, the number of appearing base field multiplications is three. These are represented by two representations of $(a_0+a_1) (a_0+d \times a_1)$, $a_0 a_1$ by using a property of $(a_0+a_1) (a_0-a_1)=a_0^2-a_1^2$.

<Itoh-Tsujii Method>

One of calculation methods for inversion of an extension field. An inverse of an extension field is expressed by calculating an inverse of a base field using a property that a member of the base field can be obtained by calculating a norm map of a member of the extension field. When a member of the extension field is g, $g^{(-1)}=v(g) \times N(g)^{(-1)}$ where N(g) is a norm map and v(g) is a map with an exponent smaller by 1 than the norm map is obtained. The map N and the map v can be calculated by Frobenius mapping and multiplication.

The invention is not limited to the embodiment presented above, but may be embodied with various modified components in implementation without departing from the spirit of the inventions. Further, the invention can be embodied in various forms by appropriately combining a plurality of components disclosed in the embodiment. For example, some of the components presented in the embodiment may be omitted. Further, some components in different embodiments may be appropriately combined. In addition, various modifications as described as examples below may be made.

In the embodiments described above, the arithmetic unit 52 may perform the limited $F_{p^{mn}}$ multiplication by any of the following (a) to (d) when n=L*r (L: positive integer, r: positive integer) and L=2.

(a) perform one multiplication of $F_{p^{mr}}$, one multiplication of $F_{p^{mr}}$ in which r(r−1)/2 multiplications of $F_{p^m}$ are reused from the multiplication of $F_{p^{mr}}$, and addition of $F_{p^{mr}}$;

(b) perform one multiplication of $F_{p^{mr}}$, one multiplication of $F_{p^{mr}}$ in which r(r−1)/2 multiplications of $F_{p^m}$ are reused from the multiplication of $F_{p^{mr}}$, on multiplication of $F_{p^m}$ and addition of $F_{p^{mr}}$;

(c) perform two multiplications of $F_{p^{mr}}$ and addition of $F_{p^{mr}}$; and (d) perform two multiplications $F_{p^{mr}}$, r multiplications of $F_{p^m}$ and addition of $F_{p^{mr}}$.

Note that (a) is a specific example of calculation between a limited projective representation in which (r−1) elements are zero elements 0 and a limited projective representation in which (r−1) elements are zero elements and one element is an identity element. (b) is a specific example of calculation between limited projective representations in which (r−1) elements are zero elements 0, (c) is a specific example of calculation between a projective representation and a limited projective representation in which (r−1) elements are zero elements 0 and one element is an identity element 1, and (d) is a specific example of calculation between a projective representation and a limited projective representation in which (r−1) elements are zero elements 0 and one element is an identity element 1.

Further more, in the embodiments described above, the arithmetic unit 52 may perform one Frobenius mapping of $F_{p^{mr}}$, one Frobenius mapping of $F_{p^m}$ and one multiplication of a constant as the limited $F_{p^{mn}}$ Frobenius mapping when n=L*r (L: positive integer, r: positive integer) and L=2. This is a specific example of calculation of a limited projective representation in which (r−1) elements are zero elements.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An arithmetic device for performing algebraic torus operation to which either one of
a set of n elements $(h_0, h_1, \ldots, h_{n-1})$ ($h_i$: a member of a finite field $F_{p^m}$, $0 \leq i \leq n-1$) representing a member g of an n-th degree algebraic torus $T_n(F_{p^m})$ (n: positive integer, p: prime number, m: positive integer) in a projective representation and
a set of $\phi(n)$ elements $(c_0, c_1, \ldots, c_{\phi(n)-1})$ ($c_i$: a member of the finite field $F_{p^m}$, $0 \leq i \leq \phi(n)-1$, $\phi(x)$: Euler function) represented by an affine representation is input, the arithmetic device comprising:
a representation converting unit configured to convert either one of
the set of n elements $(h_0, h_1, \ldots, h_{n-1})$ and
the set of $\phi(n)$ elements $(c_0, c_1, \ldots, c_{\phi(n)-1})$ into a set of n elements $(h'_0, h'_1, \ldots, h'_{n-1})$ ($h'_i$: a member of the finite field $F_{p^m}$, $0 \leq i \leq n-1$) in which at least one element is a zero element "0" or an identity element "1" out of n elements representing the member g of the n-th degree algebraic torus $T_n(F_{p^m})$ in a limited projective representation; and
an arithmetic unit configured to omit part of $F_{p^m}$ operation that is arithmetic operation in a finite field $F_{p^{mn}}$ based on a fact that an element in the set of n elements $(h'_0, h'_1, \ldots, h'_{n-1})$ represented by the limited projective representation is a zero element "0" or an identity element "1" when performing the $F_{p^{mn}}$ operation in combination with the $F_{p^m}$ operation.

2. The arithmetic device according to claim 1, wherein n=L*r (L: positive integer, r: positive integer) is satisfied, and
the representation converting unit converts the member g of the n-th degree algebraic torus $T_n(F_{p^m})$ into a set of n elements $(h'_0, h'_1, \ldots, h'_{n-1})$ represented by a limited projective representation in which at least (r−1) elements out of n elements are zero elements "0".

3. The arithmetic device according to claim 2, wherein
the representation converting unit converts the member g of the n-th degree algebraic torus $T_n(F_{p^m})$ into a set of n elements $(h'_0, h'_1, \ldots, h'_{n-1})$ represented by a limited projective representation in which at least one element out of n elements is an identity element "1".

4. The arithmetic device according to claim 3, wherein the arithmetic unit includes:
a mapping unit to which the set of n elements $(h'_0, h'_1, \ldots, h'_{n-1})$ that is a limited projective representation is input and which is configured to perform limited $F_{p^{mn}}$ Frobenius mapping omitting part of Frobenius mapping in the finite field $F_{p^{mn}}$; and
a multiplying unit to which a set of n elements $(k'_0, k'_1, \ldots, k'_{n-1})$ that is a result of performing the limited $F_{p^{mn}}$ Frobenius mapping and represented by a limited projective representation is input as at least one input and which is configured to perform limited $F_{p^{mn}}$ multiplication omitting part of multiplication in the finite field $F_{p^{mn}}$.

5. The arithmetic device according to claim 4, wherein the arithmetic unit performs limited $F_{p^{mn}}$ multiplication.

* * * * *